United States Patent [19]

Brown et al.

[11] 4,179,748

[45] Dec. 18, 1979

[54] PROGRAMMER AND METHOD OF STORING INFORMATION THEREIN AND ACCESSING INFORMATION THEREFROM

[75] Inventors: Floyd P. Brown, Santa Clara; Peter D. Narvaez, Cupertino, both of Calif.

[73] Assignee: National Semiconductor Corporation, Santa Clara, Calif.

[21] Appl. No.: 908,062

[22] Filed: May 22, 1978

Related U.S. Application Data

[63] Continuation of Ser. No. 587,284, Jun. 16, 1975, abandoned.

[51] Int. Cl.² .............................................. G06F 3/02
[52] U.S. Cl. ................................ 364/900; 340/365 S
[58] Field of Search ... 364/200 MS File, 900 MS File, 364/706, 709; 340/365 S

[56] References Cited

U.S. PATENT DOCUMENTS

| | | | |
|---|---|---|---|
| 3,593,313 | 7/1971 | Tomaszewski et al. | 364/900 |
| 3,725,877 | 4/1973 | Keil | 340/365 S X |
| 3,859,635 | 1/1975 | Watson et al. | 364/200 |
| 4,028,538 | 6/1977 | Olander et al. | 364/900 |
| 4,063,221 | 12/1977 | Watson et al. | 364/900 |
| 4,086,627 | 4/1978 | Bennett et al. | 364/200 |

OTHER PUBLICATIONS

M6800 Microprocessor Application Manual, pp. 1-8; 5-1-11; 3-8-13, 16-20; 6-48, 49, 60, 61, 64; copyright Motorola Inc., 1975.

*Primary Examiner*—Mark E. Nusbaum
*Attorney, Agent, or Firm*—Brown & Martin

[57] ABSTRACT

A programmer unit which is connected to the keyboard of a machine is capable of storing, as a program, the sequential occurance of key closures, and of supplying simulated key closures through the keyboard to the machine in the order in which such key closures were initially generated and stored. The programmer enters that key closure information into a storage register. The programmer includes a main control circuit which is responsive to various inputs supplied thereto for also entering control information into the storage register. A register control circuit is responsive to instructions from the main control circuit for entering this information into the correct position within the storage register. When the stored program is accessed, the register control circuit is responsive to instructions from the main control circuit for transmitting key closure information from the storage register in the order in which such information was originally stored. The accessed information is converted into signals which simulate key closures and such signals are connected through the matrix keyboard to the machine being controlled. A method of storing a program in such a programmer unit includes entering a pair of control words into adjacent storage locations and thereafter shifting one of the control words one storage location for each word of key closure information and filling the vacated storage locations with words of key closure information. Such key closure information may correspond to the closure of either a function key or a programmer control key. During accessing of the stored program, a third control word is initially entered and one of the pair of control words previously entered will be at a storage location which will always be adjacent the next word of key closure information which is to be accessed.

9 Claims, 24 Drawing Figures

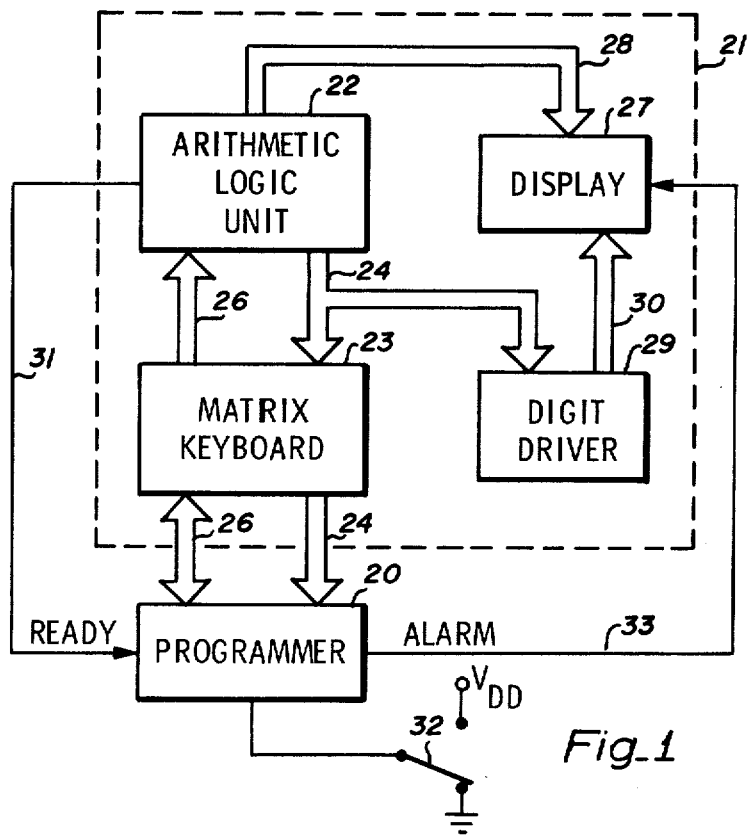
Fig_1
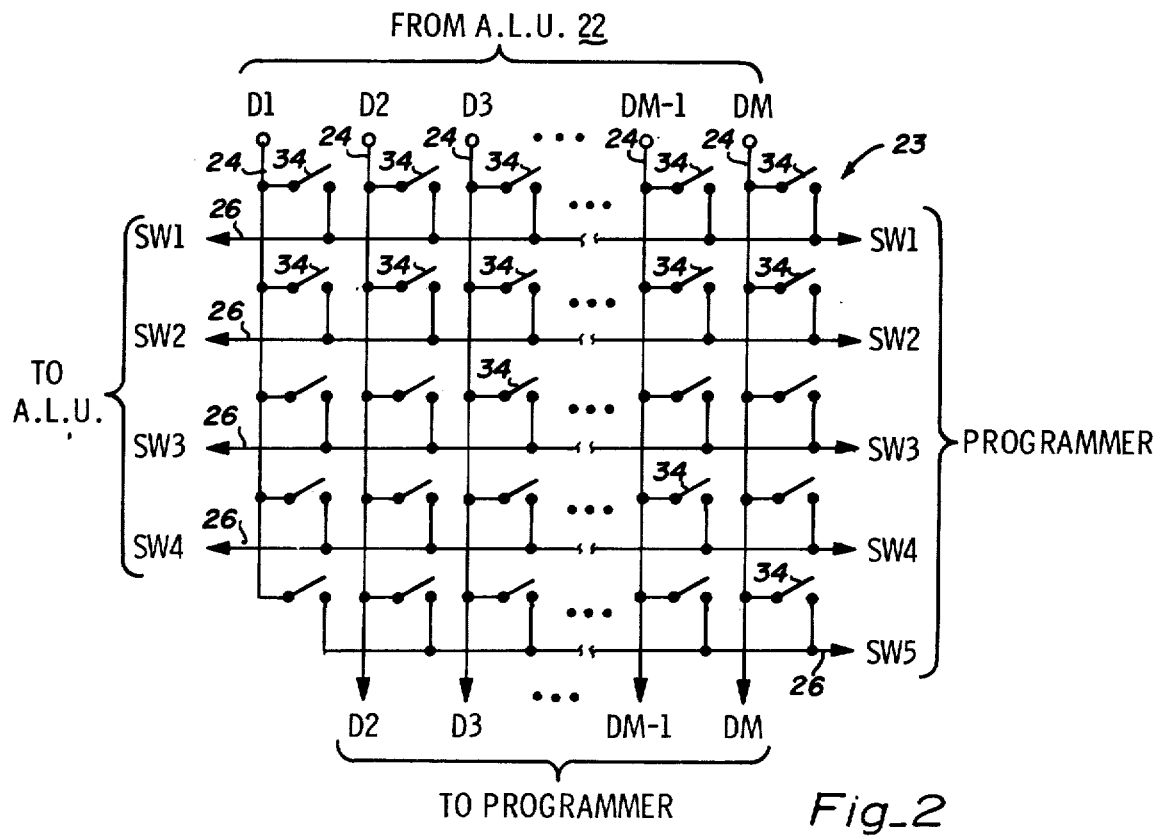
Fig_2

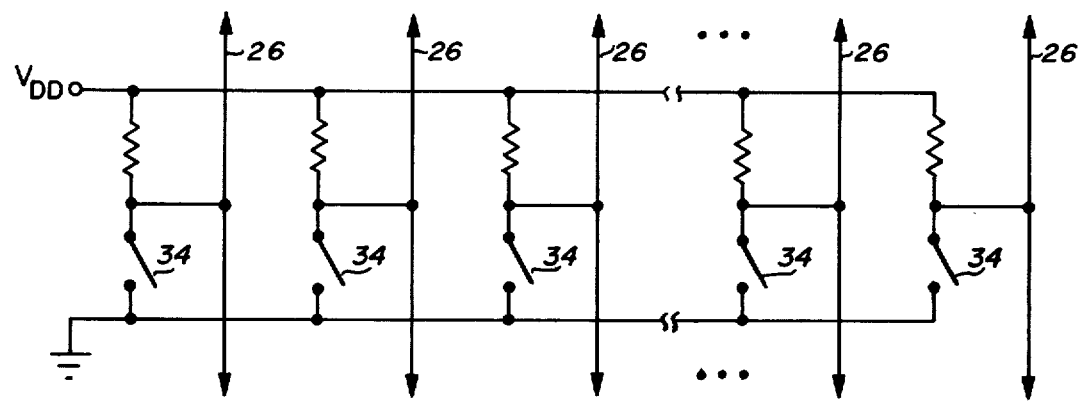
Fig_3
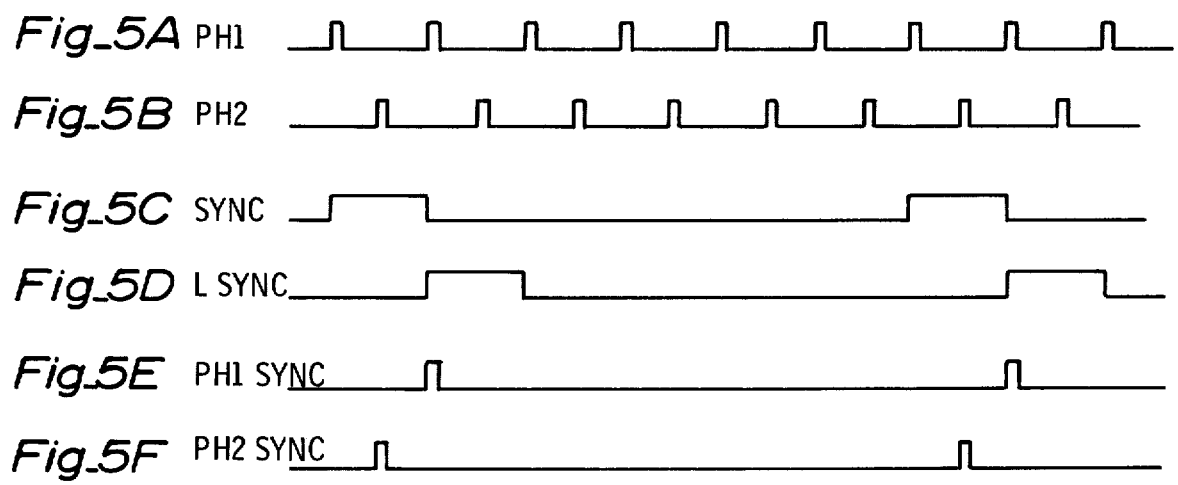
Fig_5A PH1
Fig_5B PH2
Fig_5C SYNC
Fig_5D L SYNC
Fig_5E PH1 SYNC
Fig_5F PH2 SYNC

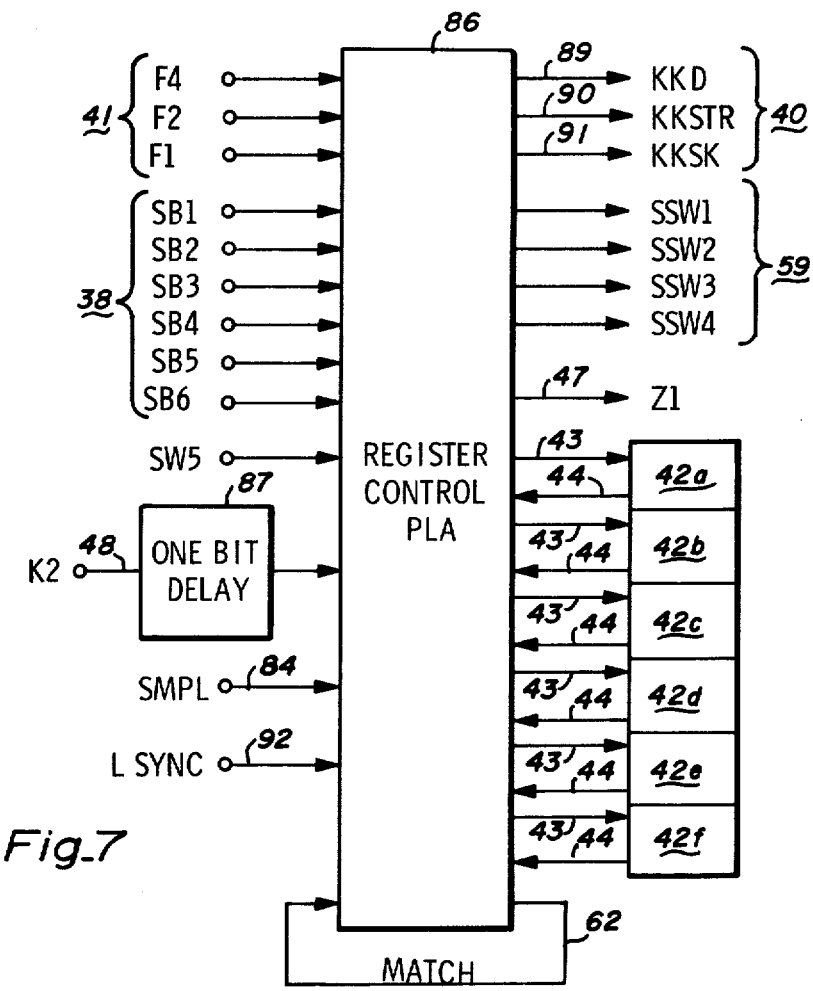
Fig_7
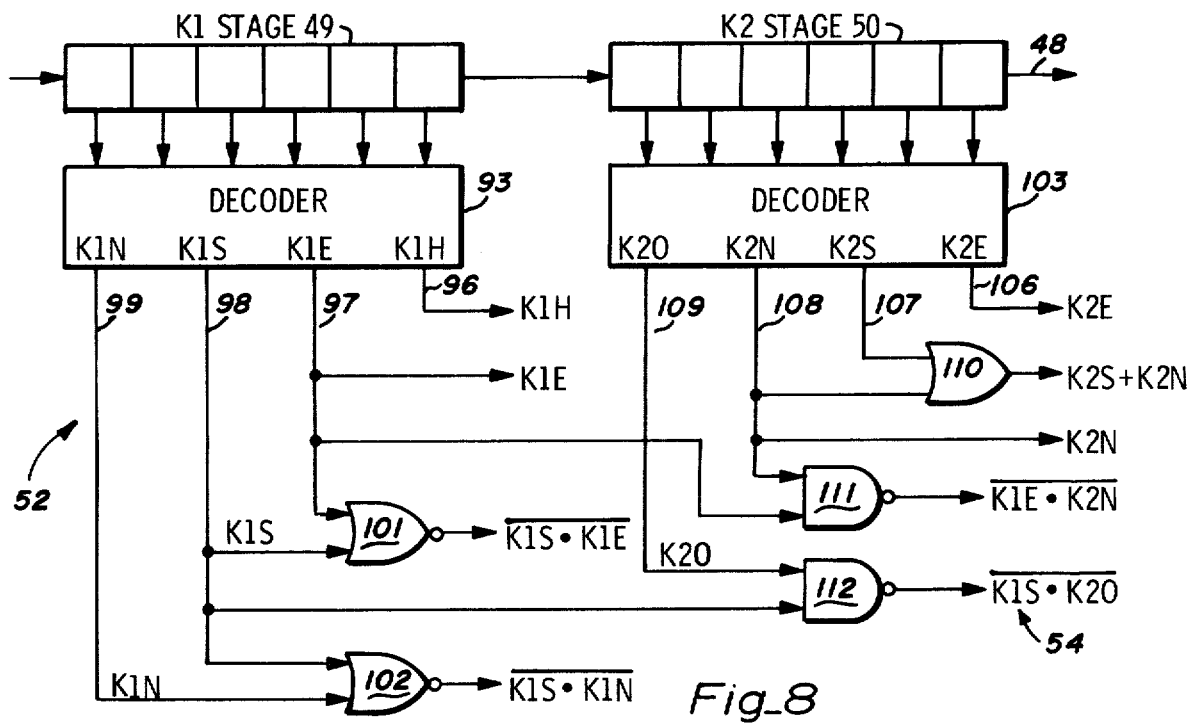
Fig_8

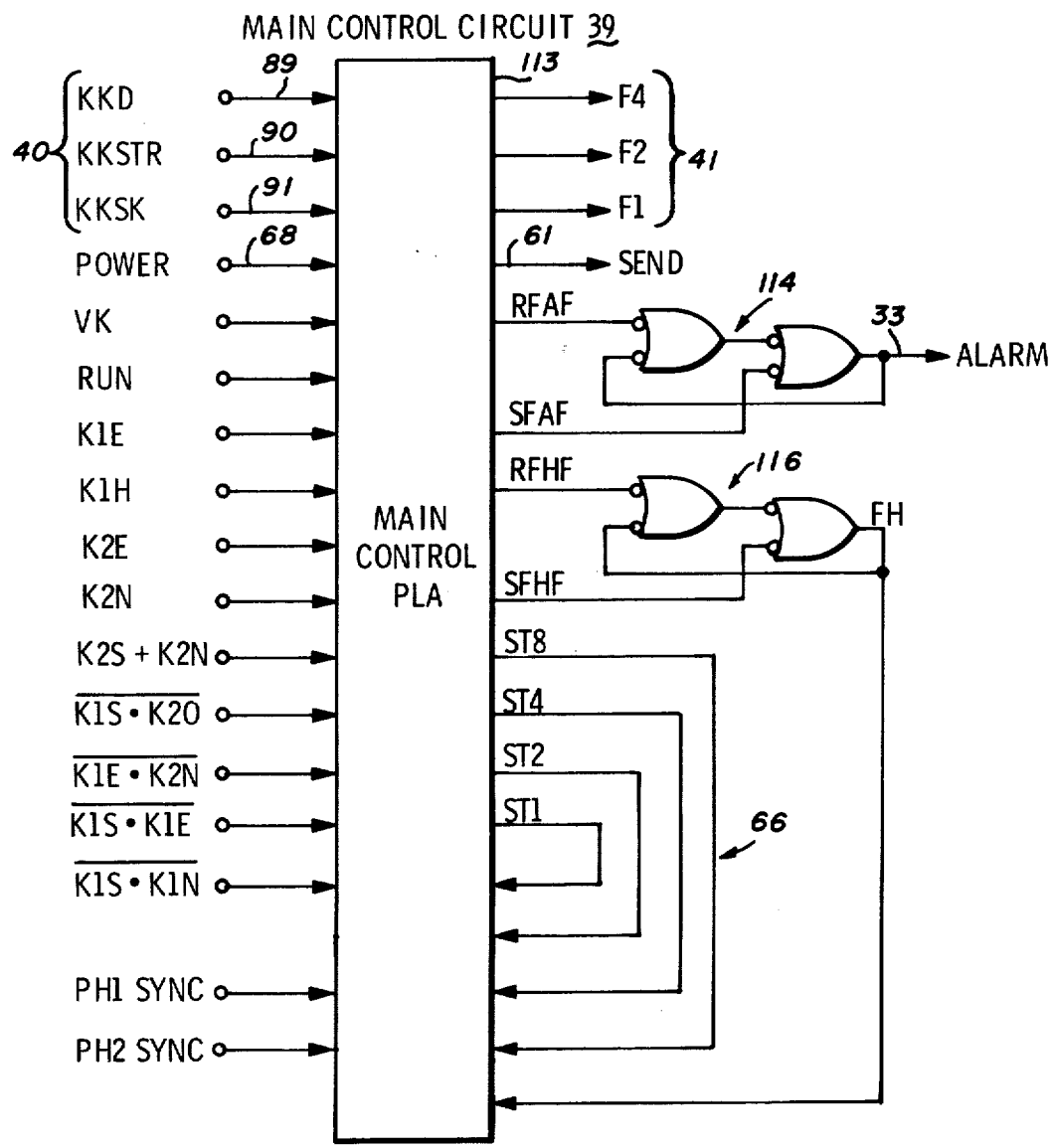
Fig_9
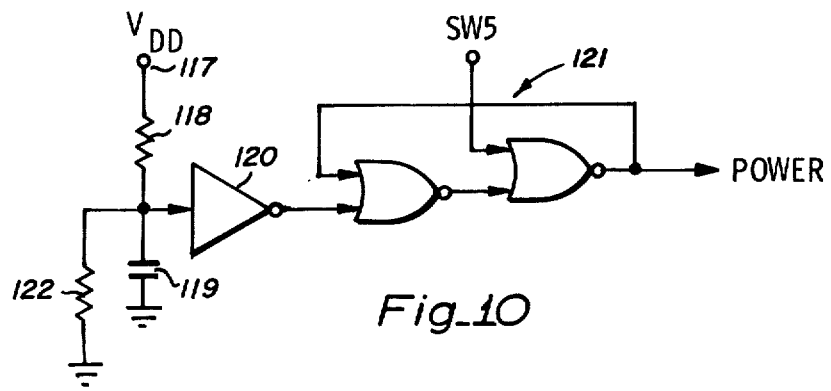
Fig_10

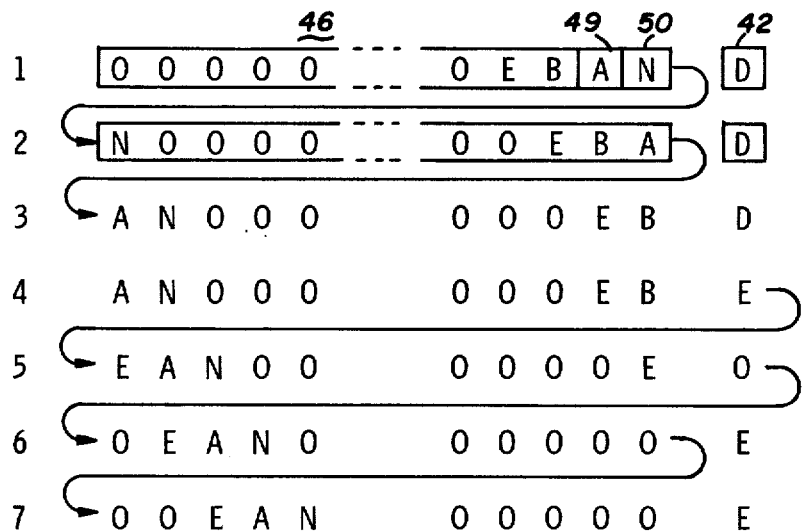
Fig_11C
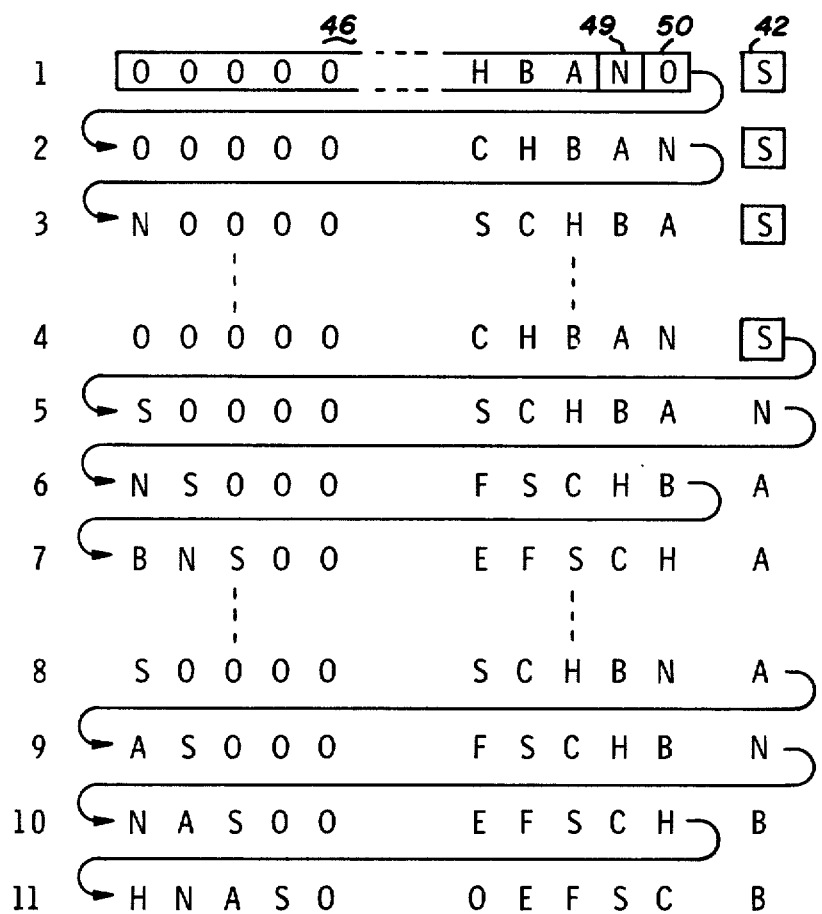
Fig_11D

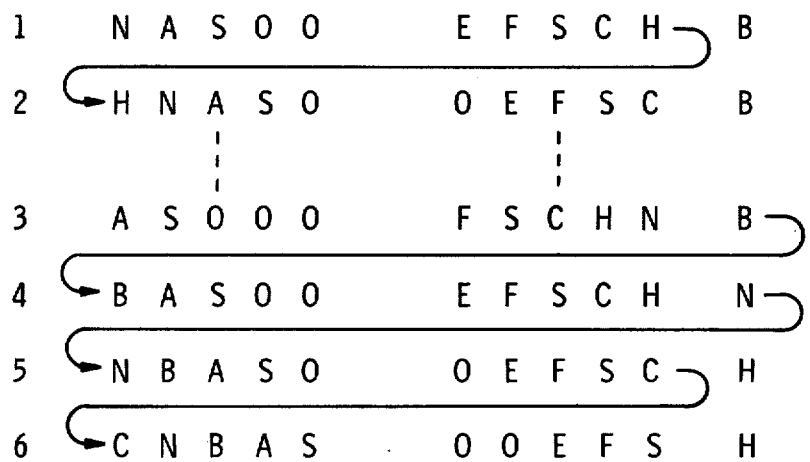
Fig_11E
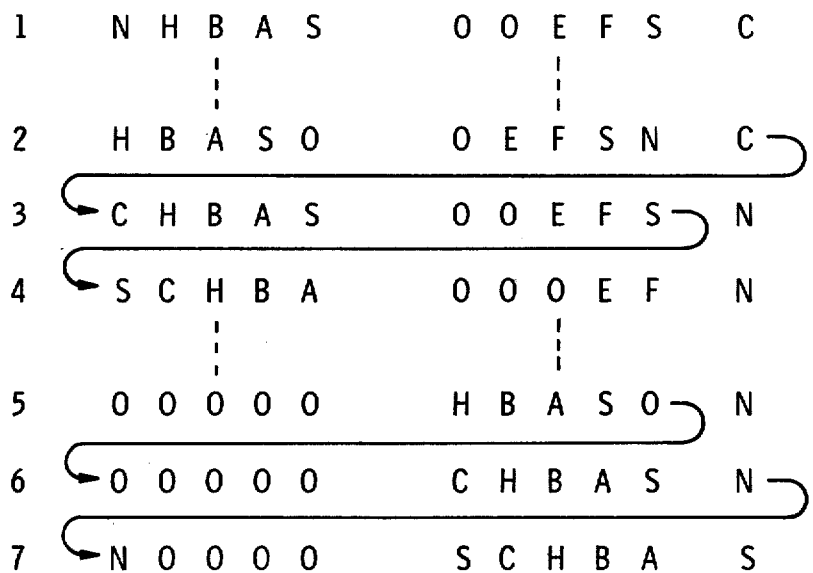
Fig_11F

Fig_11G

| | | | | | | | | | | | |
|---|---|---|---|---|---|---|---|---|---|---|---|
| 1 | B | A | S | 0 | 0 | | E | F | S | C | N | H |
| 2 | B | A | S | 0 | 0 | | E | F | S | C | N | S |
| 3 | B | A | S | 0 | 0 | | E | F | S | C | N | H |
| 4 | H | B | A | S | 0 | | 0 | E | F | S | C | N |
| 5 | N | H | B | A | S | | 0 | 0 | E | F | S | C |

Fig_11H

| | | | | | | | | | | | |
|---|---|---|---|---|---|---|---|---|---|---|---|
| 1 | 0 | 0 | | E | F | S | C | H | B | A | N | O | S |
| 2 | 0 | 0 | | O | E | F | S | C | H | B | A | N | S |
| 3 | S | 0 | | 0 | 0 | E | F | S | C | H | B | A | N |
| 4 | C | H | | 0 | 0 | 0 | 0 | 0 | 0 | E | F | S | N |
| 5 | N | C | | 0 | 0 | 0 | 0 | 0 | 0 | 0 | E | F | S |

Fig_11J

| | | | | | | | | | | | |
|---|---|---|---|---|---|---|---|---|---|---|---|
| 1 | B | A | S | 0 | 0 | | E | F | S | C | N | S |
| 2 | B | A | S | 0 | 0 | | E | F | S | C | N | H |
| 3 | N | B | A | S | 0 | | O | E | F | S | C | H |
| 4 | B | A | S | 0 | 0 | | E | F | S | C | N | H |
| 5 | H | B | A | S | 0 | | O | E | F | S | C | N |
| 6 | C | H | B | A | S | | O | D | E | F | S | N |
| 7 | N | C | H | B | A | | 0 | 0 | O | E | F | S |

PROGRAMMER AND METHOD OF STORING INFORMATION THEREIN AND ACCESSING INFORMATION THEREFROM

This is a continuation of application Ser. No. 587,284, filed June 16, 1975 now abandoned.

BACKGROUND OF THE INVENTION

1. Field of the Invention

This invention relates generally to a memory or storage device for storing a sequence of occurances which initiate machine operations, and more particularly to such a device which can be employed to program a machine which is controlled by an input terminal, such as a keyboard, and to a method of storing information in and retrieving information from such a device.

2. Prior Art

Programmers are employed for storing information corresponding to a series of sequential functions to be or being performed by a machine or information corresponding to instructions for performing such functions. A great majority of these machines which can be controlled from a stored program are operated by a keyboard. Examples of such machines include calculators, numerical control machines, and process controllers. Generally, each key of the keyboard represents either a function to be performed or a numerical value related to a function to be performed. For purposes of this description, however, keys which correspond to numerical values will be considered, along with those keys which correspond to machine functions, as function keys. Present day calculators, for example, are capable of employing the same key to represent either a numerical value or a machine function. When a machine is provided with programming capability, its keyboard also includes control keys for controlling the operation of the programmer.

When key closures correspond to functions to be performed by a machine, that machine must be capable of translating those key closures into information which it temporarily stores and can interpert as an instruction for performing that function. Accordingly, each word of stored instruction information represents a particular function to be performed by that machine, and each such word is in the form of an instruction code unique to each particular machine. It has been the practice in the past to store that information to form a program which can subsequently be accessed to control the operation of the machine. Accordingly, prior known programmers have been designed to store information corresponding to a function represented by a key closure. However, if such programmers are to be employed with more than one type of machine, the operations or functions of those machines must be identical for the programmer unit to correctly recognize the information. That is, since the instruction code corresponding to a particular function of one machine usually differs from the instruction code of another machine corresponding to the same function, a particular programmer designed to recognize and store the instruction codes of one machine may not be able to recognize and store the instruction codes of the other machine to form a useable program.

In the electronic calculators, for example, the arithmetic unit of that calculator must be able to recognize the function of a key which has been depressed in order to perform an arithmetic operation in accordance with that function. Generally, when a key is closed, an instruction code or word is generated which initiates a subroutine for performing the function represented by that key. Prior know programmers have been employed for storing the instruction codes or words supplied to the arithmetic unit of the calculator so that it can subsequently duplicate that instruction code or word to reinitiate the same subroutine. However, the instruction code for initiating a particular subroutine in one machine will initiate an entirely different subroutine in a different machine. One type of electronic calculator, for example, may employ a key at one location on the keyboard for initiating a trigonometric function and an other machine may employ a key at the same location to initiate a conversion function or subroutine. Accordingly, prior known programmers are not capable of being employed with more than one type of machine and are, therefore, not interchangeable.

In addition, most programmer units are designed to accept information generated at some point within a machine which is removed from the input terminal or keyboard thereof. This is considered desirable, since the data reduction accomplished by the input logic circuitry of the machine is utilized to reduce the amount of information required to be stored by a programmer. However, the input logic circuitry of each different type of machine is usually designed to take advantage of certain characteristics of that machine. As an example, one type of calculator which is known does not convert switch line information from its associated keyboard into a stored instruction code, but simply employs that information temporarily. A programmer for that calculator must be designed to recognize this method of handling information within the calculator. However, the same programmer would not be able, without modification, to accept information from a machine which did not employ this information handling technique. Accordingly, it can be appreciated that prior known programmers have been designed as dedicated components of a total system and are, therefore, not universal in their usage with various types of machines.

It has also been the practice in the past to design programmer units as an integral part of the associated controlled machine. Generally, the designer of such a programmer unit also relies upon the input logic circuitry of the controlled machine which recognizes a key closure to reduce the amount of storage required by the programmer unit to store a program. As a result, such prior known programmers are dedicated to the particular machine for which they are designed.

It has been the practice in the past to employ random access memories (RAM) as the memory or storage units for storing instruction codes in programmer units. As is well known, counters are required for generating input and output addresses for such random access memories. It can be appreciated that the elimination of such counters would reduce the amount of circuitry required and would greatly facilitate implementation of the device. Such reduction of the required circuitry and ease of implementation would reduce the cost of such a programmer. The use of random access memories does not permit an increase in the size of the storage capacity of the unit without changing the logic employed for controlling the addressing counters and the logic employed for addressing the memories.

Such prior known programmer units also require continuous synchronization with the machines with which they are associated. In this respect, such programmers have relied on timing control generated by the associated machine, or have required separate clocks or oscillators synchronized with the timing means of the associated machines. In either case, some of such programmers required external timing means which synchronize the operations of the programmer with the associated machine. The external use of such devices is, of course, undersirable.

Some of the prior known programmer units are not capable of permitting a stored program to be edited. Other types of programmer units are not capable of storing and accessing more than one program. In addition, because of the integral design of prior known programmer units with their associated arithmetic unit, such programmer units have not been capable of being self-cleaning feature, however, generally require a relatively large timing device for permitting such a clearing operation to take place before any further operations are initiated therein. Such a large timing device generally involves a capacitor which, because of its size, cannot be formed as an integrated circuit.

Accordingly, it can be appreciated that a need exists for a programmer unit which can be employed with any keyboard operated machine and is interchangeable from one type of machine to another type of machine. In this respect, it can be appreciated that a need exists for such a programmer unit which is not an integral part of the arithmetic unit of the machine, such that it can be self-contained to permit it to be employed wih other types of machines. A need also exists for such a programmer unit which does not require random access memories for storing instruction codes, thereby eliminating the requirement for counters and the like components.

SUMMARY OF THE INVENTION

It is therefore, an object of the present invention to provide a programmer unit which is entirely self-contained and not an integral part of an arithmetic unit of an associated machine.

A further object of the present invention is to provide a programmer unit which is capable of storing key closure information, rather than instruction codes generated by a key and employed by an arithmetic unit to initiate a function or subroutine.

A further object of the present invention is to provide a programmer unit which can be employed with all types of keyboard operated machines.

Still another object of the present invention is to provide a programmer unit which does not require the use of counters for generating input and output addresses for an associated memory.

Still another object of the present invention is to provide a programmer unit having a storage capacity which can be increased without effecting any logic design change.

Yet another object of the present invention is to provide a programmer unit which is entirely self-contained on a single integrated circuit chip and does not require the use of any external components.

Still another object of the present invention is to provide a programmer unit which is entirely asynchronous with respect to an associated machine.

Still another object of the present invention is to provide a programmer unit which is capable of editing a stored program.

Another object of the present invention is to provide a programmer unit which is self-clearing, but doe not require timing device which are too large for being formed as an integrated circuit device for performing such a self-clearing function.

Another object of the present invention is to provide a programmer unit which can store and access more than one program.

Still another object of the present invention is to provide a method of storing information in and accessing information from a programmer unit which eliminates the need for addressing counters and does not require synchronization of the programmer unit with an associated arithmetic unit.

These and other objects of the present invention are attained by a programmer unit which stores key closure information, rather than an instruction code for initiating a subroutine, to form a program which can be subsequently accessed to generate simulated key closures. The programmer unit of the present invention is connected to the keyboard of a keyboard operated machine, such that the simulated key closures which are generated are identical as far as the machine is concerned to a key closure performed by an operator. The programmer unit of the present invention stores such key closure information in the order in which it was originally generated and supplies simulated key closures in the same order without the use of counters or synchronization with the associated machine.

These and other objects, however, will be more fully realized and understood from the following detailed description, when taken in conjunction with the accompanying drawings, wherein:

BRIEF DESCRIPTION OF THE DRAWINGS

FIG. 1 is a block diagram of an electronic calculator and the programmer unit of the present invention connected thereto.

FIG. 2 is a schematic diagram of a matrix keyboard employed in the electronic calculator illustrated in FIG. 1.

FIG. 3 is a schematic diagram of another type of keyboard which can be employed with the programmer unit of the present invention.

FIGS. 5A-F are graphical representation of timing signals employed in the programmer unit of the present invention.

FIG. 7 is a block diagram of the register control circuit and I/O register illustrated in FIG. 4.

FIG. 8 is a logic and block diagram of the decoder circuits illustrated in FIG. 4.

FIG. 9 is a logic and block diagram of the main control circuit illustrated in FIG. 4.

FIG. 10 is a schematic and logic diagram of a clearing circuit employed with the programmer of the present invention.

FIG. 11C is a representation of the information content in the main storage register when a character is being deleted therefrom.

FIGS. 11D-G are representation of the information content in the main storage register when a program is being sent from the programmer unit, with each figure representing a different condition.

FIGS. 11H and J are representations of the information content in the main storage register when a program other than the first program stored in the main storage register is being sent, with each figure representing a different condition.

Like reference numerals throughout the various views of the drawings are intended to designate the same or similar elements or components.

DETAILED DESCRIPTION OF THE PREFERRED EMBODIMENT

SYSTEM CONCEPT

Figure 4:
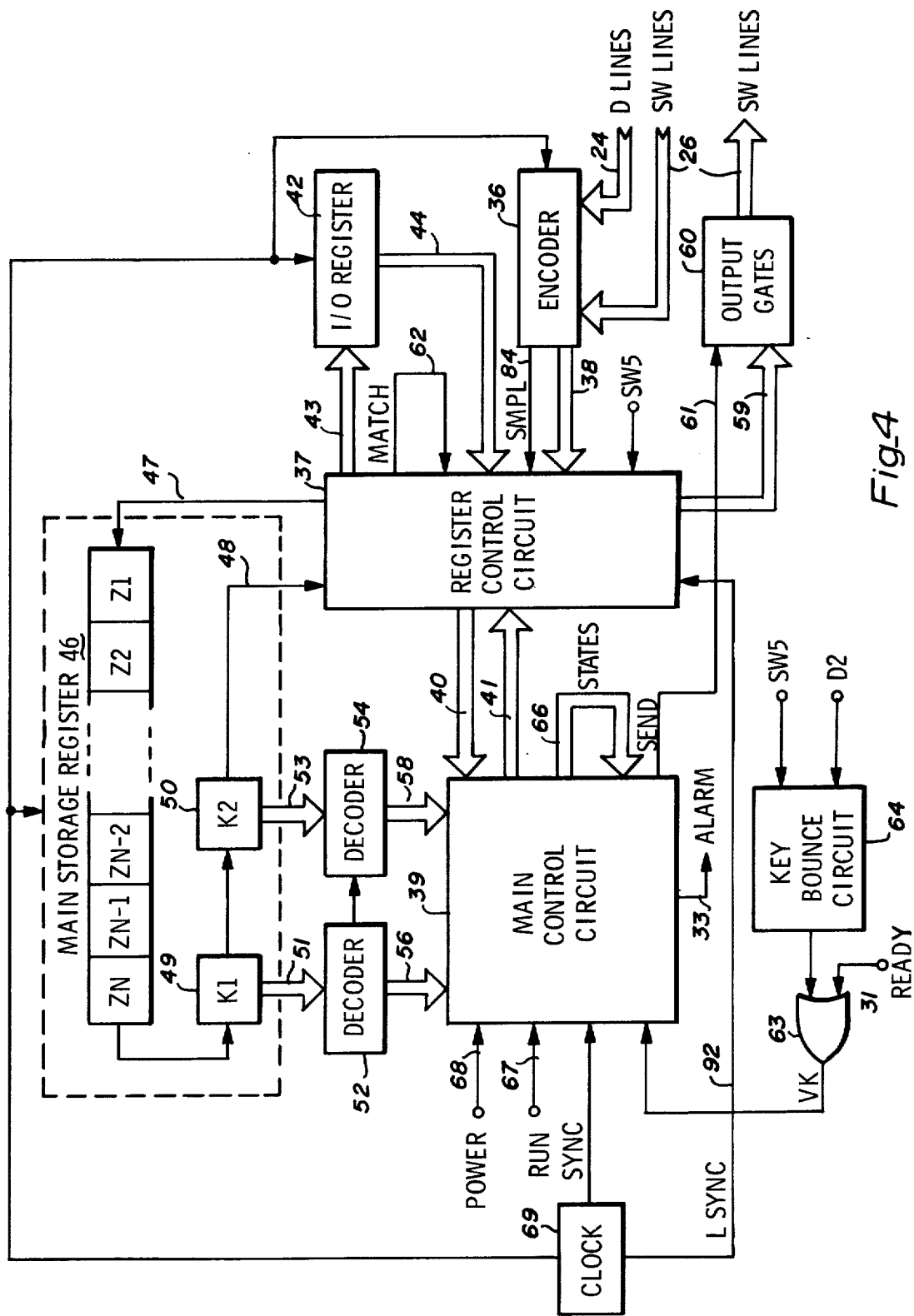
FIG. 4 is a block diagram of a programmer unit constructed in accordance with the principles of the present invention.

As previously mentioned, prior known programmers store information corresponding to functions to be or being performed by a machine or information corresponding to instructions for performing such functions. If such functions are represented by key closures, such prior known programmers rely on the ability of the machine to translate those key closures into information which corresponds to such functions before sequentially storing that information. Accordingly, if such a programmer unit is to be employed with more than one type of machine, the operations or functions of those machines must be identical for the programmer unit to recognize that information. The programmer of the present invention does not store information corresponding to the function of a particular key which is being depressed, but stores information corresponding to the occurance of a key closure or a similar input stimulus and subsequently simulates such key closures or input stimuli when the stored program is accessed. Accordingly, the programmer of the present invention can be employed with any keyboard or input terminal and its associated machine, since the key closure or input stimuli occurances are stored, rather than the functions represented thereby, and subsequently, such stored information is employed for simulating the same key closures or input stimuli.

With reference to FIG. 1, there is shown the programmer of the present invention, which is generally designated with reference numeral 20, connected to a calculator which is contained within the dashed line and designated with the reference numeral 21. It is to be understood, of course, that the programmer 20 of the present invention can be employed with any machine having a keyboard or an input terminal which generates outputs equivalent to those of a keyboard.

The calculator 21 which is shown and described herein includes an arithmetic unit 22 and a matrix keyboard 23 for supplying data to the arithmetic unit 22. The arithmetic unit 22 includes an internal counter which generates strobe signals and transmits them along a plurality of D-lines 24 to the matrix keyboard 23 and receives information along a plurality of switch lines or SW-lines 26 from the matrix keyboard 23. Within the arithmetic unit 22, the generated strobe signals which are supplied to the lines 24 are encoded and combined with encoded strobe signals returning on the lines 26 to provide information corresponding to the function represented by the particular key within the matrix keyboard 23 which has been actuated. This information is generally in the form of an instruction code to be employed for initiating or fetching a subroutine. Before an instruction code is formed, however, the validity of the closed key must be ascertained, and possibly some logical functions may be performed to establish a more readily useable instruction code, for example. The arithmetic unit 22 acts upon such information and controls a display unit 27 via a plurality of segment lines 28 in accordance with the arithmetic function which has been performed. A digit driver 29 is also connected to the D-lines 24 and drives the display 27 via a plurality of lines 30.

The programmer 20 of the present invention is connected to the D lines 24 and to the SW lines 26 of the matrix keyboard 23. The programmer 20 also accepts a READY signal from the arithmetic 22 to indicate that the arithmetic unit 22 has accepted a particular key and/or has completed performing an arithmetric operation based on the closure of a particular key. A switch 32 is manually controllable to place the programmer 20 in either a RUN mode or a LOAD mode. In addition, the programmer 20 provides an ALARM signal on a line 33 to the display 27, the function of which will be more clearly understood from the following description.

The programmer 20 which is illustrated and described herein is designed to operate most efficiently with a matrix keyboard, such as the matrix keyboard 23. However, it will be appreciated that the programmer 20 can operate with other types of keyboards or input terminals in which key closures or their equivalent are employed for controlling or establishing the operation of a related machine.

A typical exemplification of a matrix keyboard is illustrated in FIG. 2 for a better understanding of the information supplied to the programmer 20 and the information supplied from the programmer 20 to the arithmetic unit 22 via the matrix keyboard 23. As shown therein, the D lines 24 cross the SW lines 26 to form a matrix. The matrix keyboard also includes a plurality of switches 34, each of which is located at an intersection (nonelectrical) of a D line with a SW line. It is the usual practice to multiplex or strobe each of the D lines 24 in succession, such that only one D line is active at any given time. However, it is not necessary that the D lines be strobed successively as will be explained in greater detail below.

If the D lines 24 are each multiplexed or strobed successively, the closure of any one the switches 34 connected to the SW1 line 26 will generate a signal on the SW1 line only when the corresponding D line connected to that switch is provided with a strobe pulse thereon. Since the arithmetic unit 22 is generating the strobe pulses, it will be able to recognize the particular switch 34 which has been actuated by sensing the coincidence of a SW line having a strobe pulse thereon with the state of the counter which is connected to the D lines and which is generating the strobe pulses. The arithmetic unit 22 must accept this information, as an instruction to perform the particular function which that switch represents. However, the programmer 20 accepts the information from the D lines 24 and the SW lines 26 only as an occurance of a key closure of the switches 24.

The strobe pulses which are supplied from the arithmetic unit 22 along the lines 24 are supplied to the programmer 20, and the strobe pulse on a particular one of the SW lines 26 which occurs because of the closure of a particular one of the switches 34 is also supplied via the SW lines 26 to the programmer 20. An operator must be capable of controlling the programmer 20 via the keyboard 23 or an equivalent input terminal. Accordingly, one of the SW lines, SW5, is reserved for supplying information only from the matrix keyboard 23 to the programmer 20 and is not connected to the arithmetic unit 22. Accordingly, all of the switches 34 which are connected to the SW5 line represent possible control switches for controlling the operation of the programmer 20 and their actuation has no effect on the arithmetic unit 22. However, all of the switches 34 connected to SW lines SW1 through SW4 represent either arithmetic functions or numerical values and are, therefore, function keys. Accordingly, the actuation of any of these switches connected to the SW1-SW4 lines will have an effect upon both the arithmetic unit 22 and the programmer 20. Generally, the arithmetic unit 22 will perform arithmetic functions in accordance with the function or numerical value represented by those switches and the programmer 20 will store information corresponding to the occurance of a switch or key closure. When a complete program has been stored in the programmer 20, with each step thereof represented by the closure of any one of the switches 34, the programmer 20 will be capable of simulating the closure of a switch 34 by sending a simulated strobe pulse along one of the SW lines, SW1-SW4, through the matrix keyboard 23 to the arithmetic unit 22.

Although the programmer 20 disclosed herein is employed with a strobed matrix keyboard, it is to be understood that it may accept information from any keyboard or input terminal and subsequently simulate key closures in accordance with such information. Matrix type keyboards are employed to reduce the number of lines and connections between a keyboard and an arithmetic unit. In the case of a keyboard having 48 keys, a 4×12 matrix requires only sixteen lines; twelve D lines and four SW lines. Other types of keyboards must employ a matrix encoder between itself and the equipment which it controls in order to reduce the number of lines and connections. For a better understanding of the versitility of the programmer 20 of the present invention, a keyboard which is not of the matrix type is shown in FIG. 3 and will be briefly described, such that subsequent reference can be made thereto in the description of the programmer 20.

As shown in FIG. 3, each switch 34 is connected in series with a resistor between a source of voltage and ground potential. Each of the SW lines 26 is connected to the intersection of a respective switch 34 and a respective one of the resistors. As is well known, when a switch 34 is open, its associated SW line is at approximately the level of the source of voltage. However, when a switch 34 is closed, its associated SW line is at ground potential. The keyboard illustrated in FIG. 3 requires as many SW lines as the number of switches contained therein.

PROGRAMMER CONCEPT

FIG. 4 is a block diagram of the programmer 20 constructed in accordance with the principles of the present invention. As shown therein, D lines 24 and SW lines 26 are connected to an encoder 36 which encodes the information on the lines 24 and 26 as the closure of a particular key and supplies such key closure information in the form of a binary word to a register control circuit 37 via a plurality of lines 38. When the register control circuit 37 recognizes one of the key closure words supplied thereto as a control function (SW5 line), it supplies information to a main control circuit 39 via a plurality of lines 40. The main control circuit 39 is responsive to the information supplied by the register control circuit 37 as well as to other information supplied thereto, as will be described below, to generate instructions which are supplied to the register control circuit 37 via a plurality of lines 41.

An input/output (I/O) register 42 is formed of a plurality of stages, each of which is supplied with an input from the register control circuit 37 via a respective one of a plurality of lines 43 and each of which supplies an output to the register control circuit 37 via a respective one of a plurality of lines 44. A main storage register 46 also includes a plurality of stages Z1-ZN, K1 and K2, which are connected in series with one another, with an input to the register 46 being supplied from the register control circuit 37 via a line 47 and an output of the register 46 being supplied to the register control circuit 37 via a line 48. Generally, the register control circuit 37 is operative, in response to instructions supplied from the main control circuit 39 via the lines 41, to either connect the input of the register 46 to its output or to connect the input of the register 46 to an output of the register 42 and the output of the register 46 to the input of the register 42. Accordingly, information will either be recirculated within the main storage register 46 or it will be shifted from the output of the register 42 into the register 46 and from the output of the register 46 into the register 42. When the register 46 is being recirculated, generally each stage of the register 42 is also being recirculated, such that the information therein will remain at the same stage during such recirculation.

Any information which is stored in the main storage register 46 is supplied thereto only through the I/O register 42 and is removed therefrom only through the I/O register 42. Control words are supplied to the I/O register 42 either from the encoder 36 via the register control circuit 37 or from the register control circuit 37 in response to instructions supplied thereto from the main control circuit 39. When these control words have been entered in the main storage register 46 and circulated to the K1 stage 49 or the K2 stage 50 thereof, the main control circuit 39 may take appropriate action to change the instructions being supplied to the register control circuit 37. More particularly, the K1 stage 49 is connected via a plurality of lines 51 to a decoder 52 and the K2 stage 50 is connected via a plurality of lines 53 to a decoder 54. The decoders 52 and 54 are connected by a plurality of lines 56 and 58, respectively, to the main control circuit 39. Accordingly, control words in stages 49 and 50 are decoded by the decoders 52 and 54 to supply information to the main control circuit 39.

Information corresponding to the occurance of a key closure is also supplied by the encoder 36 via the register control circuit 37 to the I/O register 42. In response to certain instructions from the main control circuit 39, the register control circuit 37 enters each word of this information into the appropriate location in the main storage register 46. When information corresponding to the occurance of a key closure of a key closure is to be removed from the main storage register 46, it is first entered into the I/O register 42 via the register control circuit 37 in response to instructions from the main control circuit 39. A portion of such information is then supplied via the register control circuit 37 and a plurality of lines 59 to output gates 60. A SEND signal from the main control circuit 39 on a line 61 enables the output gate 60 at an appropriate time to supply pulses on the SW lines 26 which simulate strobe pulses. These simulated strobe pulses are transmitted through the SW-lines of the keyboard matrix 23 to the arithmetic unit 22. Each of these simulated strobe pulses will occur in coincidence with the strobe pulse supplied to an appropriate D line 24 by the arithmetic unit 22. Such coincidence is determined by performing a comparison of the encoded D lines 24 in the register control circuit 37 with a portion of the key closure information stored in the I/O register 42. When such a comparison exists, the register control circuit 37 provides its own input instructions on a line 62 for supplying the simulated strobe pulses to the output gates 60. Accordingly, it can be appreciated that the strobe signals supplied on the D lines 24 do not provide synchronization of the operations of the programmer 20 with the arithmetic unit 22, but are employed during the RUN mode of the programmer 20 to synchronize only the transmission of simulated strobe pulses to the arithmetic unit 22. It can be appreciated, therefore, that the programmer 20 operates asynchronously of the arithmetic unit 22.

The arithmetic unit 22 does, however, supply a READY signal on the line 31 to the programmer 20. The arithmetic unit 22 includes a key bounce circuit which is effectively a timer employed for validating a key closure, thereby preventing detection of the key until it has been positively depressed and preventing detection of another key until the previously detected key has been positively released. When such action is being performed, the READY signal is active. Also, when the arithmetic unit 22 is performing an arithmetic function, the READY signal is active. This information is supplied to the main control circuit 39 via an OR gate 63. Since the SW5 line is not connected to the arithmetic unit 22, the programmer 20 includes a key bounce circuit 64 for validating any key closure which would supply a strobe pulse on the SW5 line. Accordingly, the SW5 line is connected to the key bounce circuit 64. In addition, the D2 line is connected to the key bounce circuit 64, such that the key validation function is performed during the time that a strobe pulse is being supplied to the D2 line. An output of the key bounce circuit 64 is supplied through the OR gate 63 to the main control circuit 39. The output of the OR gate 63 is designated VK and the condition of this signal is sensed by the main control circuit 39 to perform certain operations.

The main control circuit 39 is a state device and relies upon a proper combination of the inputs supplied thereto and its previous state to achieve a new stage. In this respect, the previous state of the main control circuit 39 is recognized as a control input connected thereto via a plurality of lines 66. As mentioned in the discussion above of FIG. 1, a switch 32 is employed for placing the programmer 20 in either a RUN mode or LOAD mode. A signal corresponding to the position of the switch 32 is supplied to the main control circuit 39 on a line 67. The state of the main control circuit 39 is also dependent upon the amount of time which has elapsed from the time at which power is first supplied thereto. A signal designated POWER is supplied as an input to the main control circuit 39 on a line 68 to provide an indication of this condition. Accordingly, input conditions are supplied to the main control circuit 39 from the register control circuit 37, the OR gate 63, the decoders 52 and 54, and the lines 66, 67 and 68. Timing signals are supplied to the main control circuit 39 from a clock 69. The main control circuit 39 acts on all of the inputs supplied to it during one phase signal, the input phase signal, of the clock 69 and generates outputs during a second phase signal, the output phase signal, from the clock 69, which outputs are generated on the lines 33, 61 and 41. Accordingly, these output signals will be retained during the interval between two successive output phase signal pulses.

As previously mentioned, control functions for the programmer 20 can be supplied from any one of the keys in the matrix keyboard 23 which are connected to the SW5 line. In addition, a control function is supplied to the programmer 20 from the RUN/LOAD switch 32. In a constructed embodiment of the present invention, four control keys were employed on the SW5 line, which are designated START, SKIP, HALT and DELETE. It is to be understood, of course, that a greater or lesser number of control switches may be employed to either increase or decrease the amount of control provided to an operator.

When the RUN/LOAD switch 32 is in the LOAD position, the programmer 20 is prepared for accepting a key closure sequence, and when it is in the RUN position, the programmer 20 is prepared to simulate that previously entered key closure sequence. When the programmer 20 is in the LOAD mode, the following operations will be performed with the closure of any one of the control keys. Closure of the START switch in the LOAD mode clears all previously stored information from the main control register 46 and initializes the programmer 20 for accepting words corresponding to the closure of keys. Closure of the SKIP key in the LOAD mode enters a corresponding control character or word, designated S, into the I/O register 42 to indicate the beginning of any but the first program. When in the LOAD mode and the HALT key is depressed, a corresponding control character or word, designated H, is inserted into the I/O register 42 to provide a discontinuity in the subsequent execution of the program in which it is inserted. Generally, when the DELETE switch is depressed in the LOAD mode, the last stored information word in the main storage register 46 is removed therefrom.

When the programmer is being cleared, either during a start-up condition, or when the START key is depressed in the LOAD mode, two control characters or words are forced into the I/O register 42 and subsequently transferred to the main storage register 46. These characters are designated N and E, with the N character occupying a storage location which marks the beginning of a first program in the register 46 during the LOAD mode and occupying a storage location which is adjacent the next word to be accessed during the RUN mode. The E character occupies a storage location which marks the end of all programs in both the LOAD and RUN modes, such that in the LOAD mode, it also occupies a storage location which is the next location to be occupied by a key closure word to be added to the programs. An S character is also inserted at the beginning of the first program when the START key is first depressed in the RUN mode. When this occurs, the first key closure word in the program is placed in the I/O register 42 and the N character takes its place in the main storage register 46. As will be better understood from the description of the operation, the first program contained in the main storage register 46 will always be preceeded by the control characters S and O in adjacent storage locations. This permits the main control circuit 39 to distinguish between the first stored program and all subsequent stored programs.

Whenever the START key is first depressed in the RUN mode of operation, the S character is inserted into the first storage location of the program and execution begins. The program is then accessed without further action on the part of the operator until an H character is sensed. When the H character is sensed during accessing of the program, the accessing function ceases and further execution of the program relies upon the operator taking some appropriate action. The operator, therefore, is given the opportunity to enter information to be supplied to the arithmetic unit 22 at this point in the program, or to observe the results of the arithmetic operations performed by the arithmetic unit 22 in response to the simulated key closure information supplied while accessing the previous part of the program. The information which may be entered by the operator at this point in the program may be numeric information, function information, or a combination of numeric and function information. More particularly, until either the START key or SKIP key (see description below) is depressed. When the START key is again depressed, however, the program will again be accessed until another H character is encountered or the end of the program is reached.

When the programmer 20 is in the RUN mode, closure of the SKIP key at either the beginning of a program or when a program has been halted will cause the main control circuit 39 to seek the next stored program and begin execution of that program, and continue execution until either a HALT or the end of that program is encountered. Closure of either the HALT or DELETE keys in the RUN mode will have no effect.

Accordingly, it can be appreciated that the programmer 20 of the present invention sequentially stores information corresponding to the occurance of key closures and subsequently simulates the closure of those keys, such that the arithmetic unit 22 will respond to such simulated closures as if an actual key closure has occured. The invention, however, will be more clearly understood from the following description in which each of the component parts of the programmer 20 will first be described in detail and then the operation of the programmer 20 will be described.

ENCODER AND OUTPUT GATES

Figure 6:
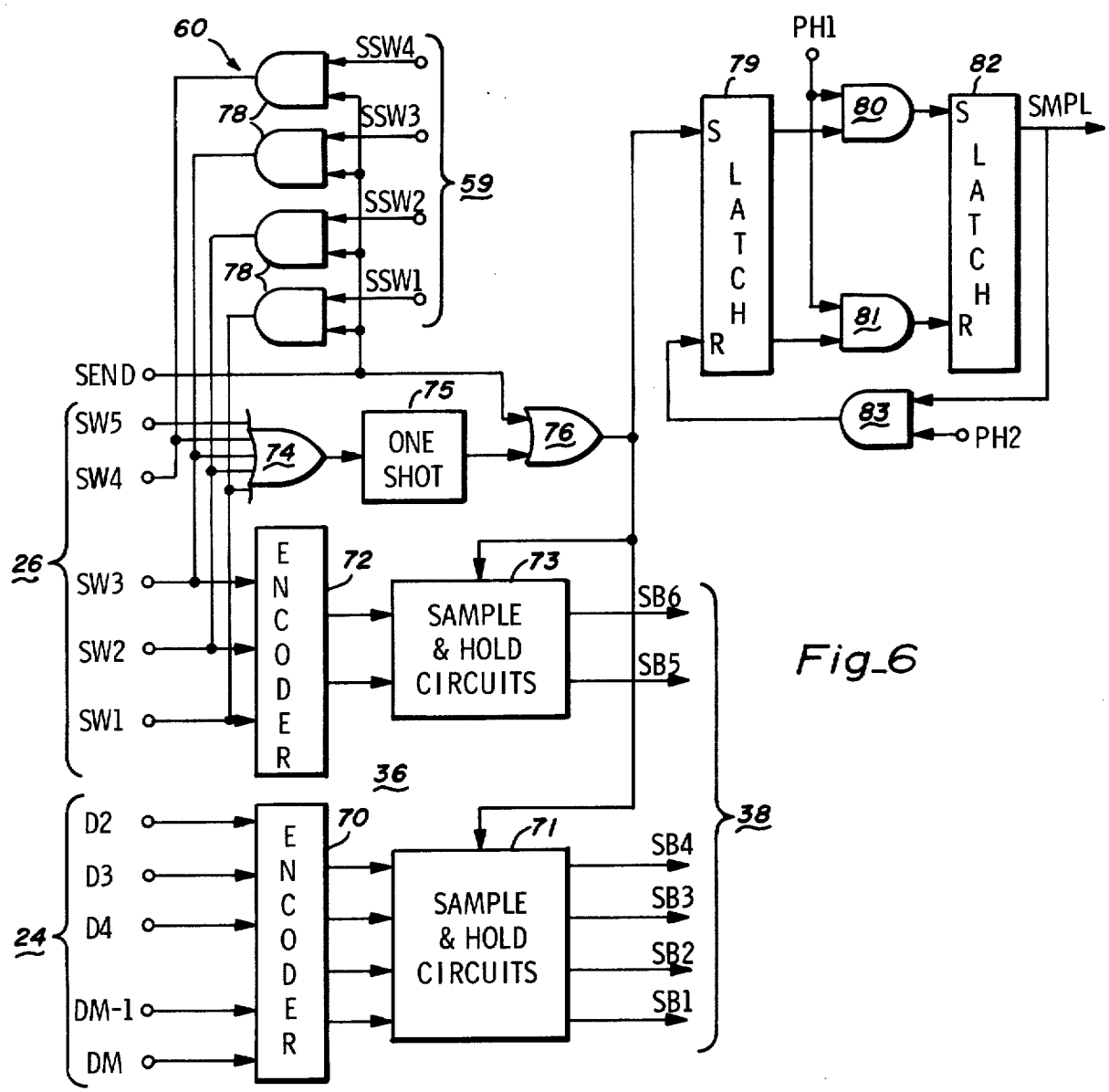
FIG. 6 is a logic and block diagram of the encoder and output gates illustrated in FIG. 4.

The encoder circuit 36 and output gates 60 are illustrated in greater detail in FIG. 6. As shown therein, the D lines 24 are connected to an encoder 70 which produces a binary output on four output lines connected through a sample and hold circuits 71 to a respective one of the lines 38. With four outputs, the encoder 70 is capable of encoding 16 input lines. Table I illustrates the binary words produced on the lines 38 when a strobe pulse is provided on one of the D lines 24. The column designations correspond to a respective one of the D lines. It will be noted that in the present embodiment, only twelve D lines are encoded.

TABLE I

| | SB4 | SB3 | SB2 | SB1 |
|---|---|---|---|---|
| D1 | 0 | 0 | 0 | 0 |
| D2 | 0 | 0 | 0 | 1 |
| D3 | 0 | 0 | 1 | 0 |
| D4 | 0 | 0 | 1 | 1 |
| D5 | 0 | 1 | 0 | 0 |
| D6 | 0 | 1 | 0 | 1 |
| D7 | 0 | 1 | 1 | 0 |

TABLE I-continued

| | SB4 | SB3 | SB2 | SB1 |
|---|---|---|---|---|
| D8 | 0 | 1 | 1 | 1 |
| D9 | 1 | 0 | 0 | 0 |
| D10 | 1 | 0 | 0 | 1 |
| D11 | 1 | 0 | 1 | 0 |
| D12 | 1 | 0 | 1 | 1 |

The SW1 to SW4 lines 26 are connected to an encoder 72 which generates a second part of a binary word and supplies it through sample and hold circuits 73 to lines 38. Table II illustrates the binary outputs provided on the SB5 and SB6 lines when a particular one of the SW1 to SW4 lines has a strobe pulse thereon.

TABLE II

| | SB6 | SB5 |
|---|---|---|
| SW4 | 0 | 0 |
| SW3 | 1 | 1 |
| SW2 | 1 | 0 |
| SW1 | 0 | 1 |

All of the SW lines 26, SW1 to SW5, are connected to a respective input of an OR gate 74 having its output connected through a one shot circuit 75 to one input of an OR gate 76. The SEND signal is connected to the other input of the OR gate 76. The output of the OR gate 76 is connected to each of the sample and hold circuits 71 and each of the sample and hold circuits 73 to enable those circuits. Accordingly, when one of the SW lines 26 goes high or the SEND signal goes high, an output of the one shot circuit 75 will also go high to enable each of the sample and hold circuits 71 and 73 to sample information therein. This enabling signal is required, since the information on the D lines 24 is continuously changing. Also, the sample and hold circuits 73 are enabled at the same time with the sample and hold circuits 71, such that information will be entered therein at the same time and immediately prior to the generation of a SMPL pulse, the function of which will be described below. The sample and hold circuits 71 and 73 will not hold information therein indefinitely, but will permit such information to decay with the passage of time. This can be accomplished by employing a capacitor to store the information in the form of a voltage and connecting an appropriately dimensioned resistor in parallel therewith. Generally, it is desirable to hold information in the sample and hold circuits 71 and 73 for at least two PH1 signal cycle times (see FIG. 5A), but no more than about ten PH1 signal cycle times to eliminate the possibility of excessive delays.

The output gates 60 include a plurality of AND gates 78, each having one of their inputs connected to the SEND signal and their other input connected to a respective one of the lines 59. When a program is being accessed from the main storage registor 46 and the I/O register 42, the register control circuit 37 generates a high level signal on one of the lines 59. Such a high level signal is transmitted through a respective one of the AND gates 78 to a respective one of the SW1 to SW4 lines when the SEND signal is high. Accordingly, a simulated strobe pulses will be transmitted through a keyboard 23 to the arithmetic unit 22. Before this simulated strobe pulse can be generated, however, the register control circuit 37 must recognize an equality comparison of a portion of the information in the I/O register 42 with the information at an output of the encoder 70. Accordingly, the sample and hold circuits 71 and 73 are also enabled to sample information therein when the SEND signal is high.

An output of the OR gate 76 is also connected to the SET input of a latch circuit 79, such that whenever the SEND signal is high or one of the SW lines is high, the latch 79 will be set. The SET output of the latch 79 is connected to one input of AND gate 80 and the RESET output of the latch 79 is connected to one input of AND gate 81, the other inputs of the AND gates 80 and 81 being connected to the PH1 clock signal, the waveform of which is illustrated in FIG. 5A. An output of the AND gate 80 is connected to the SET input of a latch circuit 82 and the output of the AND gate 81 is connected to the RESET input of the latch circuit 82. Accordingly, when the latch circuit 79 has been set, the next occurance of the PH1 clock signal going high will set the latch circuit 82. An output of the latch circuit 82 is connected to one input of an AND gate 83 having its other input connected to the PH2 clock signal, the waveform of which is illustrated in FIG. 5B. An output of the AND gate 83 is connected to the RESET input of latch circuit 79. Accordingly, after the latch circuit 82 has been set, the next occurance of the PH2 clock signal going high will cause the latch circuit 79 to be reset. When the latch 79 has been reset, the next occurance of the PH1 clock signal going high will cause the latch circuit 82 to be reset. Accordingly, a positive pulse will be supplied at an output of the latch circuit 82 on a line 84 which will have a duration beginning at the leading edge of one PH1 positive pulse and ending at the positive going edge of the next PH1 positive pulse. The signal on the line 84 is designated SMPL and is employed by the register control circuit 37 for entering information on the lines 38 therein. Accordingly, on the next positive pulse of the PH1 signal after the sample and hold circuits 71 and 73 have been enabled to sample information therein, the outputs of the sample and hold circuits 71 and 73 will be received by the register control circuit 37 (FIG. 4) in response to the high level condition of the SMPL signal.

REGISTER CONTROL CIRCUIT AND I/O REGISTER-GENERAL

The register control circuit 37 and I/O register 42 are illustrated in FIG. 7. As previously mentioned, instructions are supplied to the register control 37 from the main control circuit 39 via a plurality of lines 41. As shown in FIG. 7, the lines 41 consist of three lines, such that information in binary form thereon will provide as many as eight instructions to the register control circuit 37. These eight instructions will be designated INST 0-7 and their function will be explained in greater detail below.

The register control circuit of the present invention includes a programmable logic array (PLA) 86. A PLA is a logic circuit which is equivalent to two sets of NOR gates, with the first set of NOR gates being connected to the input terms and forming partial product terms, and the second set of NOR gates employing those partial product terms to generate output terms. Such programmable logic arrays, however, are well known in the art and further explanation of their structure and function is not necessary for purposes of this description. PLA's may be either synchronous by having their internal gates enabled by clock pulses, or asynchronous. The PLA 86 is asynchronous in that it does not employ clock pulses for enabling its internal gates and for all practical purposes will supply an output immediately upon the application of a set of input conditions thereto.

Table III is a list of the instructions supplied on the lines 41 and the corresponding functions performed by the PLA 86 in abbreviated form.

TABLE III

| INST | FUNCTION |
| --- | --- |
| 0 | Recirculate |
| 1 | Recirculate, Send |
| 2 | Jam H and Recirculate |
| 3 | Load Key, Recirculate |
| 4 | Shift |
| 5 | Shift 0's |
| 6 | Jam N and Shift |
| 7 | Jam E and Shift 0's |

It will be noted from Table III that when the binary condition of the lines 41 corresponds to INSTs 0-3, the PLA 86 perform a recirculate function, and when the binary condition of the lines 41 corresponds to INSTs 4-7 the PLA 86 may perform a shift function. The I/O register 42 is a dynamic register in that it is supplied with the PH1 and PH2 clock signals, with the inputs supplied to each stage thereof being sensed when the PH2 signal is at a high level and the outputs being generated by each stage thereof when the PH1 signal is at a high level. As previously mentioned, the output of the main storage register 46 is connected to the register control circuit 37 via a line 48 and the register control circuit 37 is connected to the input of the main storage register 46 via a line 47, both of which lines are shown in FIG. 7. Also, the input of each stage of the I/O register 42 is connected to an output of the register control circuit 37 via a respective one of a plurality of lines 43, and the output of each stage of the I/O register 42 is connected to a respective input of the register control circuit 37 via a respective one of a plurality of lines 44. When the PLA 86 is performing a recirculate function, the output of the main storage register 46 is connected to its input by connecting the line 48 through a one bit circuit 87 to the line 47. The purpose of the one bit delay circuit 87 will be described below. Also, during the recirculate function of the PLA 86, the output of each stage of the I/O register 42 on a respective one of the lines 44 is connected to its input on a respective one of the lines 43. Accordingly, during the recirculate mode of operation of the PLA 86, information is continuously being recirculated through the main storage register 46 in a conventional manner, but information in the I/O register 42 will be recirculated such that the same information will remain in the same stage thereof. Since the I/O register 42 and the main storage register 46 are dynamic registers, such continuous movement of information therein is required. However, during the recirculate function, the I/O register 42 will appear to be a static register, since the information therein will remain at the same stage thereof.

During the shift mode of operation of the PLA 86, the I/O register 42 is connected as a six bit serial shift register. That is the output of all but the last stage 42f of the I/O register 42 is connected to the input of a succeeding stage thereof. That is, the PLA 86 connects the output of stage 42a to the input of stage 42b, the output of stage 42b to the input of stage 42c, etc. Also during the shift mode of operation of the PLA 86, the output of stage 42f is connected via the PLA 86 to the input of the main storage register 46 on the line 47. During INSTs 4 and 6, the output of the delay circuit 87 will also be connected by the PLA 86 to the input of the stage 42a. However, during INSTs 5 and 7, the input of the stage 42a is disconnected, such that binary 0's are supplied to the I/O register 42.

-INSTs 0,4 and 5

Three of the instructions supplied to the PLA 86 cause only one function to be performed. That is, during INST 0, only the recirculate function is performed; during INST 4, only the shift function is performed; and during INST 5, only the shift 0's function is performed. All of the remaining INSTs cause the PLA 86 to perform multiple functions.

-INST 3

When INST 3 is supplied to the PLA 86, information contained on the lines 38 and 84 from the encoder circuit 36 and on the SW5 line from the keyboard 23 will be examined to establish a particular set of outputs to be supplied to the inputs of the I/O register 42. When the SMPL signal is at a low level during INST 3, information will be recirculated in the registers 42 and 46 as previously mentioned. However, during INST 3 when the SMPL signal is high, binary information contained on the SB1 to SB6 lines 38 will be supplied to the I/O register 42. More particularly, during this set of input conditions, binary information on the SB1 through SB6 lines will be supplied in parallel to stages 42f to 42a, respectively. Information contained on the lines 38 as the result of the closure of a function key is shown in Tables I and II.

As previosly mentioned, all of the control keys are connected only to the SW5 line in the keyboard 23. Whenever such a control key is depressed, it is desirable to store information representing the occurance of that key closure in the I/O register 42, such that approprite information corresponding thereto can be supplied to the main control circuit 39. Accordingly, when a strobe pulse appears on the SW5 line, an input will be supplied to the PLA 86 on input line 88 to permit information corresponding to one of the control keys to be entered into the I/O register 42. As previously mentioned, the control keys of the disclosed embodiment of the present invention include a START key, a SKIP key, a DELETE key, and a HALT key. These keys are connected to the D5-D8 lines as shown in Table IV. Accordingly, when a strobe pulse occurs on the SW5 line, the SB6-SB1 lines will contain binary information as shown in Table IV.

TABLE IV

| KEY | D-line | SW6 | SW5 | SW4 | SW3 | SW2 | SW1 |
|---|---|---|---|---|---|---|---|
| START | D5 | 0 | 0 | 0 | 1 | 0 | 0 |
| SKIP | D6 | 0 | 0 | 0 | 1 | 0 | 1 |
| DELETE | D7 | 0 | 0 | 0 | 1 | 1 | 0 |
| HALT | D8 | 0 | 0 | 0 | 1 | 1 | 1 |

When the SMPL signal is at a high level, and during INST 3, this information corresponding to the closure of a control key will be supplied to the individual stages of the I/O register 42. However, whenever, a strobe pulse appears on the SW5 line, a binary "1" will be entered into the stage 42c, such that the information shown in Table IV will be converted to the information as shown in Table V.

TABLE V

| KEY OR CHARACTER | 42a | 42b | 42c | 42d | 42e | 42f |
|---|---|---|---|---|---|---|
| START & S | 0 | 0 | 1 | 1 | 0 | 0 |
| SKIP & S | 0 | 0 | 1 | 1 | 0 | 1 |
| DELETE | 0 | 0 | 1 | 1 | 1 | 0 |
| HALT & H | 0 | 0 | 1 | 1 | 1 | 1 |
| N | 0 | 1 | 1 | 1 | 1 | 0 |
| E | 0 | 1 | 1 | 1 | 0 | 0 |

It will be noted from Table I that the closure of any function key will not produce the binary combination of "11" in stages 42c and 42d. Whenever the PLA 86 recognizes as an input on the lines 44 the storage of information corresponding to the closure of either the START, SKIP or DELETE keys, an output will be provided on one of the lines 40. More particularly, when information corresponding to the closure of a DELETE key is stored in the I/O register 42, the PLA 86 will generate a high level signal on line 89; when information corresponding to the closure of the START key is contained in the I/O register 42, the PLA 86 will generate a high level signal on line 90; and when information corresponding to the closure of the SKIP key is contained in the I/O register 42, the PLA 86 will provide a high level signal on line 91. These outputs will be generated during any one of INST 0-7.

It will be noted that Table V also lists certain control characters; namely, S, H, N and E. The S and H characters contained in the I/O register 42 as a result of the closure of either the START, SKIP or HALT keys will be supplied to the main storage register 46 when information is shifted from the I/O register 42 thereto. These control characters will be subsequently employed for controlling the main control circuit 39 via the decoders 52 and 54 when such information is sensed in the stages 49 and 50 of the register 46. The remaining control characters listed in Table V will be discussed below. Any information which is contained in the I/O register 42 when a SHIFT instruction is generated by the main control circuit 39 and supplied to the register control circuit 37 will be shifted into the main storage register 46.

-INST 1

Whenever the binary information in the stages 42c to 42f of the I/O register is identical to the binary information on the SB4 to SB1 lines, respectively, a high level signal is generated at an output of the PLA 86 on the line 62 and supplied to an input thereof. Such comparision and matching of the information in the last four stages of the I/O register 42 with the information on the SB4 to SB1 lines occurs at all times, regardless of the instructions being supplied on the lines 41. During INST 1, when the MATCH signal is at a high level, the binary information contained in stages 42a and 42b will decoded by the PLA 86 to generate an appropriate simulated strobe pulse on one of the SSW1 to SSW4 lines 59. Table VI illustrates binary information in the stages 42a and 42b which will provide a simulated strobe pulse on one of the lines 59.

TABLE VI

| | 42a | 42b |
|---|---|---|
| SSW4 | 0 | 0 |
| SSW3 | 1 | 1 |
| SSW2 | 1 | 0 |

TABLE VI-continued

| | 42a | 42b |
|---|---|---|
| SSW1 | 0 | 1 |

-INST 2

The H character is inserted into a program whenever the HALT key is depressed to cause the operation during the RUN mode to cease at that point in the program, such that a variable, for example, can be supplied to the calculator. This information is also entered into the I/O register 42 (as dictated by INST 3). That is, the binary information corresponding to the H character will be destroyed in the I/O register 42 during the RUN mode when a function key is depressed to enter the desired information into the arithmetic unit 22. Since it is necessary to retain the H character and not enter into the program the information corresponding to the key which has been depressed, the programmer writes over that informaion in the I/O register 42 with new binary information corresponding to an H character. This function is performed whenever an INST 2 is being supplied to the PLA 86 on the lines 41.

An L SYNC signal on a line 92 is supplied from the clock 69 to the register control PLA 86 for inhibiting the recirculate function during INST 2 whenever this signal is at a high level. Also, when the L SYNC signal is at a high level, a binary "0" is entered into each of the stages 42a and 42b and a binary "1" is inserted into each of the stages 42c, d, e and f to generate the H character. The waveform of the L SYNC signal is illustrated in FIG. 5d and the binary content of the H character is shown in Table V. When the L SYNC signal is at a low level, the I/O register 42 is recirculated by the PLA 86 during INST 2, such that the binary content of the register 42 does not change after the H character is inserted therein and for the remainder of the INST 2 period.

-INST 6

The N control character is generated whenever the programmer is being initialized, either from a start up condition or during a clearing operation. The N character is generated whenever INST 6 is being supplied on the lines 41 to the PLA 86. The control character N is employed during the LOAD mode of operation to indicate the beginning of the first program stored therein and is employed during the RUN mode of operation to indicate the next character to be accessed from a program. This function of the N character will be more clearly understood from the detailed description of the operation of the programmer of the present invention given below.

During INST 6, when the L SYNC signal is at a high level, the shift function will be inhibited and a binary "1" will be inserted into each of the stages 42c, d, e and f. Also during this time, the input lines 43 to the stages 42a and 42b will be disconnected such that a binary "0" will be inserted into each of those stages. During the high level portion of the L SYNC signal which exists for one bit time, no shifting occurs. When the L SYNC signal is at a low level, the shifting function will be active, but will only be active for five bit periods. Accordingly, such entry of the N character will appear to have been made, such that each of the stages 42a and 42f would have contained a binary "0" and each of the stages 42b, c, d and e would have contained a binary "1" as shown in Table V.

-INST 7

The control character E is employed for designating the end of all stored programs. The E character is generated during INST 7 whenever one of three conditions exists. More particularly, INST 7 is generated whenever the programmer is being initialized, either from a start up condition or during a clearing operation. The E character is also generated whenever a character is being deleted from the program and whenever a key entry is made when the main control register 46 is completely filled with program information.

During INST 7, when the L SYNC signal is at a high level, a binary "1" will be inserted into each of the stages 42c, d and e and a binary "0" will be inserted into each of the stages 42a, b and f. When the L SYNC signal is at a high level, it inhibits the shift function which normally occurs during INST 7. However, whenever the L SYNC signal is at a low level, the shifting function will be initiated and continue for the remainder of the time during which INST 7 is supplied on the lines 41 to the PLA 86. Also, the main control register 46 is a dynamic register as will be explained below and information contained therein will continue to circulate when the shift function in the I/O register 42 is inhibited, such that the information in register 46 will remain at its intended storage position in relation to the information in the register 42. Because the E character is shifted only five bit positions after it is inserted into the I/O register 42, it will appear to have been entered in the form and in the storage locations shown in Table V. After the E character has been entered and while it is being shifted into the main control register 46, no information is supplied to the input line 43 of the stage 42a, such that binary "0s" will be shifted therein.

-SUMMARY

In summation, information is entered into the I/O register 42 via the register control PLA 86 either in response to instructions from the main control circuit 39 or in response to the closure of any of the function or control keys on the keyboard 23. In response to the proper instruction from the main control circuit 39, the PLA 86 may shift the information from the I/O register 42 into the main storage register 46 to form a useable program. Also, some of the information which may be contained in the I/O register 42 is employed for generating information supplied on the lines 40 to the main control circuit 39 such that the main control circuit 39 can issue proper instructions in accordance with that information. The register control PLA 86 is also responsive to certain instructions from the main control circuit 39 to place information in the I/O register 42 which is contained in the program stored in the main storage register 46. Such information which has been accessed from the stored program can then be employed for generating a simulated strobe pulse on one of the lines 59 before it is reentered into the proper storage location in the main storage register 46.

The main control circuit 39, as will be explained in greater detail below, has an inherent one bit delay between the time at which it senses an input condition and the time at which it generates a new set of outputs based on those input conditions. The one bit delay circuit 87 permits this timing delay to occur before the information on the line 48 is acted upon.

MAIN STORAGE REGISTER

The main storage register 46 is formed of a plurality of one half bit delay inverters (not shown) arranged as shift register. The shift register is divided into six bit words by the six bit interval of SYNC signal (see FIG. 5c). The register 46 is a two phase dynamic register which is responsive to clock signals PH1 and PH2 (FIGS. 5a and 5b) supplied from the clock 69 to constantly recirculate information therethrough. At each bit position within the main storage register 46, an input is sampled during the time that the PH2 signal is high and the information contained therein is supplied at an output when the PH1 signal goes high and retains that output for one complete cycle of the PH1 signal.

CONTROL WORD DECODERS

FIG. 8 is a block and logic diagram of the k1 stage 49, the K2 state 50 and the decoders 52 and 54. Control words which have been entered into the main storage register 46 via the I/O register 42 are sensed at the K1 and K2 stages thereof to supply appropriate inputs to the main control circuit 39. Five such control words are decoded by the decoders 52 and 54; four of which have been described above and designated E, N, H and S. Each of the control words E, N, H and S are six bit words, each containing both binary zeros. Furthermore, the control word or character 0 can only be recognized in the K2 stage when the control word S is in the K1 stage. The function performed by each of these control words either singly or in combination with one another will be described in greater detail below.

Each bit position of the K1 stage 49 is supplied to a decoder 93 having output lines 96, 97, 98 and 99. Whenever the H control word is sensed in the K1 stage, a high output will be provided on the line 96 as represented by the designation K1H. In the same manner, whenever the E, S and N characters are sensed in the K1 stage, a high output will be provided on the lines 72, 73 and 74, respectively, as represented by the designations K1E, K1S and K1N. The lines 97 and 98 supply inputs to a NOR gate 101 which generates an output designated $\overline{K1S \cdot K1E}$. The lines 98 and 99 supply inputs to a NOR gate 102 which generates an output designated $\overline{K1S \cdot K1N}$.

Each bit of the K2 stage 50 is supplied to a decoder 103 having output lines 106, 107, 108 and 109. A high output is provided on each of the lines 106, 107, 108 and 109 whenever the control characters E, S, N and O, respectively, are sensed in the K2 stage. The K2S and K2N signals are supplied to the inputs of an OR gate 110 to generate an output term designated K2S+K2N. Line 97 from the decoder 93 and line 108 from the decoder 103 are connected to the inputs of a NAND gate 111 to generate an output designated $\overline{K1E \cdot K2N}$. In addition, line 98 of the decoder 93 and line 109 of the decoder 103 are connected to the inputs of a NAND gate 112 to generate an output term designated $\overline{K1S \cdot K2O}$. Each of the generated terms which are shown in FIG. 8 are supplied to the main control circuit 39 to control its operation.

MAIN CONTROL CIRCUIT-GENERAL

The main control circuit 39 includes a synchronous PLA 113 and a pair of latch circuits 114 and 116 as shown in FIG. 9. The PLA 113 includes inverters (not shown) between some of its inputs and its input gates such that the true and complement of some of those inputs can be supplied to its input gates. Furthermore, its input gates are enabled whenever the PH2 SYNC signal is high and its output gates are enabled whenever the PH1 SYNC signal is high (see FIGS. 5E and 5F). Also, a particular set of outputs generated by the PLA 113 will be retained for one complete cycle of the PH1 SYNC signal. Accordingly, the PH2 SYNC signal is the input phase signal and the PH1 SYNC signal is the output phase signal referred to above.

The synchronous nature of the PLA 113 permits it to be a state device, such that its present state can be employed as one of the input conditions supplied thereto. Depending upon the present state of the PLA 113 and other input conditions supplied thereto, the state thereof may remain the same or may change during each successive cycle of the output phase signal PH1 SYNC. The present state of the PLA 113 is supplied as an output on lines 66 as soon as the PH1 SYNC signal goes high and that output is maintained at least until the next occurance of the PH1 SYNC signal going high. The output on the lines 66 is sensed as an input at the time that the PH2 SYNC signal goes high. Accordingly, the PLA 113 will maintain a particular state for at least one cycle of the PH1 SYNC signal. The other outputs of the PLA 113 shown in FIG. 9 are also maintained for at least one complete cycle of the output phase signal PH1 SYNC. Also, the input conditions to the PLA 113 shown in FIG. 9 are sensed when the input phase signal PH2 SYNC signal goes high.

Inputs are supplied to the PLA 113 from the register control PLA 86 on the lines 89, 90 and 91. As previously mentioned, the POWER, VK and RUN signals are also supplied to inputs of the PLA 113. Also, all of the outputs of the decoder circuits 52 and 54 illustrated in FIG. 8 are supplied as inputs to the PLA 113.

The PLA 113, as previously mentioned, generates instructions to be supplied to the register control PLA 86 on the lines 41. Also, the SEND signal is supplied as an output on the 61. The PLA 113 also generates four signals which are designated RFAF, SFAF, RFHF and SFHF. The latch circuit 114 generates the ALARM signal at its output on a line 33 and is reset when the RFAF signal is high and is set when the SFAF signal is high. The latch circuit 116 generates a signal designated FH at its output which is supplied as an input to the PLA 113. The latch circuit 116 is reset when the RFHF signal is high and is set when the SFHF signal is high. These signals will be discussed in greater detail below.

Table VII is a listing of the stage condition of the PLA 113. The first column in Table VII lists the number of the product terms (branch products) or sum of products terms (sum of branch products) associated with the various state conditions of the PLA 113. Any unnumbered rows in the first column (shown with an asterisk) represents the absence of a branch product implementation within the PLA to cause the desired result as discussed below. The next two columns in Table VII list all of the input conditions, including the present state of the PLA 113. The last three columns in Table VII list all of the outputs of the PLA 113 including the next state that it will go to, the particular instruction to be supplied to the register control PLA 86, and the output signals SEND, RFAF, SFAF, RFHF and SFHF. The state of the PLA is represented on lines 66 by a binary wo d corresponding in BCD form to the state number.

TABLE VII

| | PRESENT STATE | OTHER INPUT CONDITIONS | NEW STATE | INSTs | OTHER OUTPUTS |
|---|---|---|---|---|---|
| 1 | * | POWER | 15 | 5 | RSAF |
| 2 | 15 | $\overline{\text{POWER}}$ | 1 | 6 | RFHF,RSAF |
| 3 | 1 | — | 2 | 7 | |
| 4 | 2 | $\overline{\text{K1E . K2N}}$ | 2 | 5 | |
| * | 2 | K1E . K2N | 0 | 0 | |
| * | 0 | VK | 0 | 0 | |
| 5 | 0 | $\overline{\text{VK}}$ | 3 | 3 | |
| 6 | 3 | $\overline{\text{VK}}$(RUN + $\overline{\text{FH}}$) | 3 | 3 | |
| 7 | 3 | $\overline{\text{RUN}}$ . FH | 9 | 2 | |
| 8 | 3 | VK | 4 | 0 | RSAF |
| 9 | 4 | $\overline{\text{RUN}}$ . $\overline{\text{K1E}}$ + RUN . $\overline{\text{K2N}}$ | 4 | 0 | |
| 10 | 4 | $\overline{\text{RUN}}$ . K1E . $\overline{\text{KKSTR}}$ . $\overline{\text{KKD}}$ | 6 | 0 | |
| 11 | 4 | $\overline{\text{RUN}}$ . K1E . KKSTR | 1 | 6 | |
| 12 | 4 | $\overline{\text{RUN}}$ . K1E . KKD . $\overline{\text{K2N}}$ | 5 | 7 | |
| 13 | 4 | $\overline{\text{RUN}}$ . K1E . KKD(K2S + K2N) | 0 | 0 | SFAF |
| 14 | 4 | $\overline{\text{RUN}}$ . K1E . KKSK(K2S + K2N | 14 | 0 | |
| * | 4 | RUN . K2N . $\overline{\text{KKSTR}}$ . $\overline{\text{KKSK}}$ | 0 | 0 | |
| 15 | 4 | RUN . K2N . KKSTR . $\overline{\text{FH}}$ | 9 | 0 | |
| 16 | 4 | RUN . K2N . KKSTR . FH | 9 | 2 | RFHF |
| 17 | 4 | RUN . K2N . KKSK . $\overline{\text{FH}}$ | 8 | 4 | |
| 18 | 4 | RUN . K2N . KKSK . FH | 9 | 2 | |
| 19 | 5 | K1S + K1N | 7 | 4 | |
| 20 | 5 | — | 0 | 4 | |
| 21 | 6 | — | 5 | 4 | |
| 22 | 7 | $\overline{\text{K1E}}$ | 7 | 0 | SFAF |
| 23 | 7 | K1E | 5 | 7 | |
| 24 | 8 | $\overline{\text{K2S + K2N}}$ | 8 | 0 | |
| 25 | 8 | K2S + K2N | 9 | 4 | |
| 26 | 9 | VK + $\overline{\text{K2N}}$ | 9 | 0 | |
| 27 | 9 | $\overline{\text{VK}}$ . K2N . $\overline{\text{FH}}$ . K1H | 10 | 4 | SFHF |
| 28 | 9 | $\overline{\text{VK}}$ . K2N . $\overline{\text{FH}}$ . $\overline{\text{K1H}}$ . $\overline{\text{K1S}}$ . $\overline{\text{K1E}}$ | 10 | 4 | |
| 29 | 9 | $\overline{\text{VK}}$ . K2N . $\overline{\text{FH}}$(K1S + K1E) | 12 | 4 | |
| 30 | 9 | $\overline{\text{VK}}$ . K2N . FH . RUN | 8 | 4 | RFHF |
| 31 | 9 | $\overline{\text{VK}}$ . K2N . FH . $\overline{\text{RUN}}$ | 12 | 4 | RFHF |
| 32 | 10 | — | 11 | 4 | |
| 33 | 11 | $\overline{\text{FH}}$ . $\overline{\text{VK}}$ | 11 | 1 | SEND |
| 34 | 11 | $\overline{\text{FH}}$ . VK | 9 | 0 | |
| * | 11 | FH | 0 | 0 | |
| 35 | 12 | $\overline{\text{K1S . K2O}}$ | 12 | 0 | |
| 36 | 12 | K1S . K2O | 5 | 0 | |
| * | 14 | — | 0 | 0 | |

-POWER UP CLEAR SUBROUTINE

When power is first supplied to the PLA 113, it will be in an undefined state as represented by the asterisk in the second column of Table VII. When the POWER signal is at a high level (branch product 1), an output will be generated on the lines 66 in binary form representing state 15, an output will be generated on the lines 41 in binary form corresponding to INST 5, and the signal RSAF will be generated. Accordingly, the register control PLA 86 will disconnect the input line 43 of the stage 42a, such that a binary "0" will be inserted therein upon each occurance of the PH 2 signal. However, the contents of each stage of the I/O register 42 will be shifted to the next stage thereof and the contents of the stage 42f thereof will be shifted to the first stage of the main storage register 46. Accordingly, binary 0's will be shifted into the registers 42 and 46 to begin clearing those registers.

The POWER signal is generated by the circuit illustrated in FIG. 10. When voltage is first supplied to the programmer 20, the voltage $V_{DD}$ will be applied to a terminal 117 which is connected through a resistor 118 and a capacitor 119 in series with one another to ground potential. Accordingly, when voltage is first applied to the programmer the capacitor 119 will begin to charge through the resistor 188. The junction of the resistor 118 and capacitor 119 is connected through an inverter 120 having a relatively high trip point to the set input of a latch circuit 121. The SW5 line from the matrix keyboard 23 is connected to the reset input of the latch 121. When the voltage $V_{DD}$ is first applied to the programmer 20, the capacitor 119 is discharged, such that the latch circuit 121 will be set to cause the POWER signal to be at a high level. Thereafter, the capacitor 119 will continue to charge until the trip point of the inverter 120 is attained to alter the input supplied therefrom to the latch circuit 121 from a high level to a low level. However, the latch circuit 121 will not be reset until one of the control keys connected to the SW5 line is depressed. When one of the control keys on the SW5 line is depressed, a high level signal will be supplied to the reset input of the latch 121, thereby generating a low level output from the latch circuit 121. The latch circuit 121 will remain reset thereafter regardless of the condition of the signal on the SW5 line and until the capacitor 119 is discharged below the voltage level of the trip point of the inverter 120. The resistor 122 is connected in parallel with the capacitor 119, such that when supply voltage is removed therefrom, it will discharge. Accordingly, under normal conditions, the latch circuit 121 will remain reset until power is removed from the circuit.

The circuit illustrated in FIG. 10 permits the clearing operation of the registers 42 and 46 to occur without requiring the use of a relatively large timing device, such as the capacitor 119. Accordingly, the capacitor 119 can be a relatively small device such that it can be incorporated into an integrated circuit. More particularly, the capacitor 119 is employed only to remember that the supply voltage had been previously removed from the programmer 20. The majority of the clearing time period is obtained by relying upon the delay between the time at which an operator actuates the main power switch and the time at which the operator depresses one of the control keys connected to the SW5 line. In an constructed embodiment of the present invention, approximately 40 milliseconds are required to clear the register 42 and 46. The capacitor 119, however, charges to the level of the trip point of the inverter 120 in approximately 100 microseconds. It can be appreciated, however, that it would take more than 40 milliseconds for an operator to move his finger from the power switch to one of the control keys. Accordingly, by relying upon this human time delay, a relatively small timing device can be employed for clearing the registers 42 and 46, such that the timing device can be incorporated into an integrated circuit.

INITIALIZE SUBROUTINE

Initially, therefore, the PLA 113 will issue INST 5 to the register control PLA 86 to clear the registers 42 and 46. When the latch circuit 121 has been reset by the closure of one of the control keys, the POWER signal will be at a low level as represented by the input condition POWER. When this input condition exists and state 15 is sensed as an input on the lines 66 (branch product 2), the PLA 113 will go to state 1, issue INST 6 to the register control PLA 86, and generate the signals RFHF and RSAF. As previously mentioned, during INST 6, the control character N will be entered into the I/O register 42. Also, the generation of the RFHF and RSAF signals will reset the latch circuits 116 and 114, respectively. As can be appreciated from Table VII, when the PLA 113 is in state 1, it will remain in that state for only one word time.

When the PLA 113 is in state 1 (branch product 3), it will generate an output corresponding to state 2 and issue INST 7 to the register control PLA 86. During INST 7, the register control PLA 86 will enter the control character E into the I/O register 42 and will thereafter shift O's behind it. Accordingly, as the PLA 113 goes from state 15 to state 1 and state 1 to state 2, the control characters N and E will be entered in adjacent word positions into the main storage register 46. When the PLA 113 is in state 2, it will remain in state 2 until the E control character is in the K1 stage and the N control character is in the K2 stage of the main storage register 46 (branch product 4). When the PLA 113 is in state 2, it will issue INST 5 to the register control PLA 86 to again shift zeros into the I/O register 42 and the information from the I/O register 42 into the main storage register 46. Thereafter, when the E character is sensed in the K1 stage and the N character is sensed in the K2 stage, the PLA 113 will go to state 0 and will issue INST 0 to the register control PLA 86, such that the information contained in the registers 42 and 46 will recirculate therein.

IDLE STATE

As shown in Table VII, when the PLA 113 is in state 0, its next state will depend upon the condition of the VK signal. As previously mentioned in the description of FIG. 4, the VK signal is generated at an output of the OR gate 63. Normally the output of the OR gate 63 is at a low level ($\overline{VK}$) when the arithmetic unit 22 indicates by a signal on the line 31 that it is prepared to accept additional information and after the release of a control key has been verified by the key bounce circuit 64. When a key is initially closed, the output of the OR gate 63 will remain at a low level for a predetermined time period, during which time either the key bounce circuit in the arithmetic unti 22 or the key bounce circuit 64 validates the occurance of such a key closure. At the end of that time period, the output of the OR gate 63 will go to a high level until either the arithmetic unit 22 has completed processing the information supplied thereto by that key closure or until the key is released and the occurance of that release is validated by the appropriate key bounce circuit.

If the VK signal is at high level when the PLA 113 is in state 0, it will remain in state 0 and continue to issue INST 0 to the register control PLA 86. However, when the PLA 113 is in state 0 and the input condition $\overline{VK}$ occurs (branch product 5), the PLA 113 will go to state 3 and will issue INST 3. With one exception, when the PLA 113 is in state 3, it will remain in state 3 and continue to issue INST 3 (branch product 6) until a key is closed and the input condition VK exists. The above mentioned exception (branch product 7) will occur when the latch 116 has been set and the operator changes from the RUN mode of operation to the LOAD mode of operation while the PLA 113 is in state 3. Setting of the latch 116 and its effect will be discussed below. The state sequence or subroutine which has been described above occurs whenever the programmer 20 is being initialized. Accordingly, when the PLA 113 is in state 3, the programmer 20 has been initialized and is prepared to receive key closure information. State 3 can, therefore, be considered the idling state of the PLA 113 in both the RUN and the LOAD modes of operation.

REINITIALIZE SUBROUTINE

Normally, when the PLA 113 is in state 3 and the condition VK (branch product 8) occurs, the PLA 113 will enter state 4 and will remain in state 4 until another input condition is satisfied. If the programmer 20 is in the LOAD mode ($\overline{\text{RUN}}$), the PLA 113 will remain in state 4 until the input condition K1E occurs (E character in the K1 stage of register 46), and if the programmer 20 is in the RUN mode, it will stay in state 4 until the input condition K2N occurs (sum of branch product 9). From table VII it can be appreciated that the input condition K1E must exist in the LOAD mode before the PLA 113 will exit from state 4 and enter any other state.

The initialize subroutine discussed above can also be entered when the PLA 113 is in state 3 and the START key is closed in the LOAD mode to generate the KKSTR signal on line 90 as an input to the PLA 113. Whenever any key is depressed in the LOAD mode and after the VK signal goes to a high level, the PLA 113 will go from state 3 to state 4, if the FH signal is not high. If the START key has been closed and the condition K1E exists in the LOAD mode (branch product 11), the PLA 113 will go from state 4 to state 1 and issue INST 6. Thereafter, the PLA 113 will follow the initialize subroutine discussed above through states 1, 2, 0 and 3. Generally, the PLA 113 will follow this subroutine to state 0 from either a start-up condition or from state 4 during the time that the START key is depressed and before its release has been validated by the key bounce circuit 64. Accordingly, the input condition $\overline{\text{VK}}$ required to move from state 0 to state 3 is usually attained as the result of the release of the START key and its subsequent validation by the key bounce circuit 64. The next occurance of the input condition VK while the PLA 113 is in state 3 will be the result of the closure of any key on the keyboard 23. In the LOAD mode, when the PLA 113 is in state 3, the closure of any key other than the START key will cause the PLA 113 to enter into one of a number of subroutines other than the initialize subroutine.

LOAD PROGRAM SUBROUTINE

When the PLA 113 is in state 4 as the result of the closure of any but the START and DELETE keys in the LOAD mode of operation and the input condition K1E exists, the PLA 113 to enter a "load program" subroutine. The "load program" subroutine causes the PLA 113 to go through at least states 6, 5 (branch product 21) and 0 (branch product 20) to state 3. If during the "load program" subroutine an input condition occurs which indicates that the main storage register 46 has been completely filled with key closure information, a "delete" subroutine will be entered from state 5 (branch product 19), pass through stage 7, (branch product 23) and return to state 5 again to delete the last entered key closure information. While the PLA 113 is in state 7 (branch product 22), the alarm latch 114 will be set. The PLA 113 will exit from the "delete" subroutine into the end of the "load program" subroutine to return the PLA 113 through state 0 (branch product 20) to state 3.

When the PLA 113 is in state 5, a character which is contained in the I/O register 42 will be loaded into the main storage register 46 to become part of the stored program. If the "delete" subroutine is entered as a result of the main storage register 46 having been completely filled with key closure information, that character which has been loaded into the program will be deleted. After a character in the I/O register 42 has been loaded (or loaded and deleted, if necessary), the PLA 113 passes through state 0 and enters state 3.

LOAD MODE-DELETE SUBROUTINE

When the PLA 113 has entered state 4 in the LOAD mode as the result of the closure of the DELETE key, the PLA 113 will enter state 5 and issue INST 7 if the condition K2N does not exist (branch product 12). However, if the condition K2N does exist under such circumstances (branch product 13), the PLA 113 will enter state 0 and issue INST 0 and set the alarm latch 114. If, on the other hand, the PLA 113 is in state 4 as the result of the closure of the DELETE key in the LOAD mode and the condition K2S exists, the PLA 113 will enter state 5, issue INST 7 and set the alarm latch 114. This action results because of the attempt of the PLA 113 to enter both states 5 and 0 (branch products 12 and 13). However, since state 5 overrides state 0, the PLA 113 will enter state 5, rather than state 0. Also, since INST 7 overrides INST 0, INST 7 will be generated on the lines 41. However, because the PLA 113 attempts to go to state 0, the alarm latch 114 will be set. This technique of overriding one state with another state when two branch products are on at the same time is considered to be a novel and unique use of a PLA. Also, the technique of overriding one instruction with another instruction is also considered to be a novel and unique use of a PLA. This technique can be better understood from the fact that the output generated on the lines 66 will attempt to be the binary word 0000 when the PLA 113 is in state 4 and the appropriate conditions exist as shown in Table VII to go to state 0. However, at the same time, the appropriate conditions may exist to cause the binary word 0101 to occur on the lines 66, such that the binary word 0101 will override the binary word 0000. Also, the binary word 0000 will attempt to appear on the lines 41, but the binary word 111 will override it to produce INST 7. Since the conditions exist for the PLA 113 to go from state 4 to state 0, the alarm latch 114 will be set as shown in Table VII.

When the PLA 113 is in state 4 during the LOAD mode as the result of the closure of the DELETE key, the last entered character in the stored program will be deleted if the control character N is not sensed in the K2 stage when the condition K1E exits. However, if the control character N is sensed in the K2 stage under such conditions, the previous closure of the DELETE key will be effectively ignored. If, on the other hand, the S control character is sensed in the K2 stage under the above conditions, it will be deleted from the program and the alarm latch 114 will be set to indicate that occurance. The subsequent closure of a key when the PLA 113 is in state 3 to generate the VK signal will reset the alarm latch 114. Under the above conditions, when the control character N is sensed in the K2 stage, no key closure information remains in the stored program. If the control character S is sensed in the K2 stage under the above conditions, the beginning marker or control character S of one program other than the first stored program will be deleted from the stored program.

LOAD MODE—SKIP SUBROUTINE

If the PLA 113 is in state 4 as the result of the closure of the SKIP key during the LOAD Mode and the condition K1E exist, but neither of the conditions K2S or K2N exist, the PLA 113 will enter state 6 to follow the "load character" subroutine to enter the control character S. However, when the PLA 113 is in state 4 as the result of the closure of the SKIP key in the LOAD mode, and the condition K1E exists and either the condition K2S or the condition K2N exists, the PLA 113 will attempt to enter both states 8 and 6. That is, branch product 10 will be active with branch product 14. Although Table VII shows branch product 14 requiring the entry to state 14, it is more accurate to indicate that branch product 14 requires the entry to state 8. However, for purposes of clarity in Table VII, state 14 has been shown as being associated with branch product 14. The ORing of the binary words on the lines 66 corresponding to state 6 and 8 will generate a binary word corresponding to state 14. That is, the ORing of the binary word 1000 corresponding to state 6 on the lines 66 will generate the binary word 1110 corresponding to state 14. When the PLA 113 enters state 14, it will issue INST 0 and thereafter return to state 0. This technique of ORing the state condition of the PLA 113 to produce or generate a third state is also considered a novel and unique use of the PLA 113.

RUN MODE

When the PLA 113 is in state 4 as the result of the closure of any key other than the START key or SKIP key in the RUN mode, the PLA 113 will enter state 0 and issue INST 0. Thereafter, the PLA 113 will return to idling state 3 to await the closure of another key.

RUN MODE—SEND PROGRAM SUBROUTINE

When the PLA 113 is in state 4 as the result of the closure of the START key and the conditions K2N and $\overline{FH}$ exist (branch product 15), the PLA 113 will enter state 9 and issue INST 0. When the PLA 113 is in state 9, it will remain in state 9 if either one of the conditions VK or $\overline{K2N}$ exist (sum of branch product 26). However, when the PLA 113 is in state 9 and the conditions $\overline{VK}$ and K2N exist, the PLA 113 will be prepared to leave state 9 and enter another state. When the PLA 113 is prepared to leave state 9 and the FH signal is at a low level and none of the conditions K1H, K1S and K1E exist (branch product 28), the PLA 113 will enter state 10 and issue INST 4. When the PLA 113 has entered state 10 under the above conditions, it will proceed to state 11 (branch product 32) and issue INST 4. While the PLA 113 is in state 11 (branch product 33) it will issue INST 1 and generate the SEND signal. Generation of the SEND signal will transmit key closure information to the arithmetic unit 22 as previously described. When such key closure information is transmitted to the arithmetic unit 22, the VK signal will be at a high level as a result of the READY signal being at a high level while the arithmetic unit 22 is performing an arithmetic operation based on that information. When the arithmetic unit 22 has completed its arithmetic operation based on that information, the PLA 113 will exit from state 11 (branch product 34) and enter state 9 again. This loop beginning with state 4 and passing through states 9, 10 and 11 and reentering state 9 is the "send program" subroutine.

If the PLA 113 is in the "send program" subroutine and the control character H is sensed in the K1 stage (branch product 27), the PLA 113 will enter state 10 from state 9, issue INST 4, and set the latch 116. Accordingly, the latch 116 is employed for remembering that an H character has been sensed in the K1 stage while key closure information from a stored program is being transmitted to the arithmetic unit 22 in the "send program" subroutine. When the HALT latch 116 has been set in state 10. (FH is at a high level) the PLA 113 passes through state 11 and goes to state 0. Thereafter, the PLA 113 returns to the idling state 3 and awaits another key closure.

If the PLA 113 is prepared to leave state 9 when the HALT latch 116 is reset, the sensing of either the condition K1S or the condition K1E when the condition K2N exists (branch product 29) will cause the PLA 113 to go through states 12 and 5 to state 0. This sequence is the termination portion or sequence of the "send program" subroutine. If the HALT latch has been set and the PLA 113 is in state 3 (branch product 7), a change from the RUN mode to the LOAD mode will cause the PLA to move directly from state 3 to state 9 and issue INST 2 to enter the control character H into the I/O register 42. When the PLA 113 enters state 9 from state 3 with the HALT latch 116 set, the control character H will be entered into the I/O register 42. Therefore, the PLA 113 will enter into the termination portion of the "send program" subroutine, but will also cause the HALT latch 116 to be reset by branch product 31.

When the PLA 113 enters state 12 under either one of the above two conditions, it will remain in state 12 (branch product 35) until the control character S is sensed in the K1 stage and the control character 0 is sensed in the K2 stage (branch product 36), which will cause the PLA 113 to go through state 5 to state 0. The control characters S and 0 in the K1 and K2 stages, respectively, indicate the beginning of the first program stored in the main storage register 46. Accordingly, whenever the "send program" subroutine terminates, the PLA 113 will return to the beginning of the first program stored in the register 46.

During the RUN mode when the PLA 113 is in state 4 as the result of the closure of the START key and the HALT latch 116 is set (branch product 16), the PLA 113 will go to state 9, issue INST 2 and reset the HALT latch 116. This is one entry into the "send program" subroutine whenever a HALT has been encountered in a stored program and execution of the stored program is to be continued from that HALT position.

During the RUN mode, when the PLA 113 has entered state 4 as the result of the closure of the SKIP key and the HALT latch 116 is reset (branch product 17), the PLA 113 will go to state 8 and issue INST 4. When the PLA 113 is in state 8, it will remain in that state until the condition K2S+K2N exists (branch product 24). While in state 8, the PLA 113 will issue INST 0 to recirculate the main storage register 46 until one of the control characters S or N is sensed in the K2 stage (branch product 25) at which time the PLA 113 will enter the "send program" subroutine through state 9. Accordingly, the PLA 113 will wait while in state 8 until the beginning of a second program stored in the main storage register 46 is found and will then begin execution of that program. If such a second program is not stored in the register 46, the PLA 113 will return to the beginning of the first stored program in the register 46 and begin execution of that program.

During the RUN mode when the PLA 113 is in state 4 as the result of the closure of the SKIP key and the HALT latch 116 is set (branch product 18), the PLA 113 will go from state 4 to state 9 and issue INST 2. When the PLA 113 has entered state 9 under such conditions, it will exit to state 8 (branch product 30) and remain in state 8 until either the control character S or the control character N is sensed in the K2 stage of the register 46. Thereafter, the PLA 113 will exit from state 8 and enter state 9 to begin the "send program" subroutine.

-PLA

In Table VII some of the branch product terms are unnumbered. These branch product terms are not implemented in the PLA 113. Whenever the PLA 113 is in one of a plurality of present states from which it may enter the same new state, the technique of not implementing the branch products in the PLA 113 which require the PLA 113 to go to that same new state may be employed under certain conditions. It is believed that this technique is a novel and unique use of a PLA. Generally, the conditions for implementing this technique require that the unimplemented branch products will require the PLA 113 to go to a state defined by the BCD word 0000 on the lines 66 and issue an instruction defined by the BCD word 000 on the lines 41. Also, only when all input conditions (including the present state, if the PLA is a state device) for all implemented branch products are not satisfied will it be possible to cause the PLA to go to that same state. In the present implemenation of the PLA 113, such unimplemented branch products are employed for causing the PLA 113 to go from state 2 to state 0, from state 0 to state 0, from state 4 to state 0, from 11 to state 0 and from state 14 to state 0. It will be noted that with the first four branch products, the complement of the unimplemented branch product is satisfied by or contained in one or more other branch products while the PLA 113 is going from a corresponding present state to the same new state. In the case of the PLA 113 going from state 14 to state 0, no other input conditions are required to cause that occurance. In the present exemplification of the PLA 113, the unimplemented branch products require the PLA 113 to go to state 0 and issue INST 0. From the previous discussion, it can be appreciated that state 0 can be overridden with any other state and INST 0 can be overridden with any other instruction.

In implementing this technique, it is preferable that the new state which is required by the unimplemented branch products (state 0) should, if possible, be that state which is most often used. Also, it is preferable, if possible, that the instruction issued when going to that new state should be that instruction which is most often used. The implementation of this technique reduces the number of branch product terms which must be implemented, thereby reducing the size of the PLA.

In the above discussion, certain control characters and their effect on the PLA 113 have been discussed. For a better understanding of the use of these control characters, the following summation of their effect on the PLA 113 when they are sensed in the K1 and K2 stages in the register 46 will be useful in understanding the operation of the programmer 20.

During the initialize subroutine, the absence of the control characters E and N in the K1 and K2 stages, respectively, indicates that the register 46 has not been cleared and, therefore, the PLA 113 will remain in state 2 until the clearing operation is completed. The E and the N characters are also employed in state 4 to set up the proper conditions for entering a state other than state 4 to permit the desired subroutine to be performed. More particularly, during the LOAD mode of operation, the E character must be sensed in the K1 stage before the PLA 113 will exit from state 4 and enter any of the other states shown in Table VII. Also, during the RUN mode of operation, the control character N must be in the K2 stage before the PLA 113 will exit from state 4 and enter any of the other states shown in Table VII. When the E and N characters are in the K1 and K2 stages, respectively, the register 46 is empty of any key closure information (as in the clearing operation). Accordingly, when the E and N characters are in stages K1 and K2, respectively, during the LOAD mode of operation, closure of the DELETE key will have no effect. However, when the control character E is in the K1 stage and the control character N is not in the K2 stage, the delete function can be performed even if the K2 stage contains the control character S. When a program is being loaded and the PLA 113 goes from state 4 through state 6 to state 5, the presence of either the control character S or the control character N in the K1 stage indicates that the register 46 is filled with key closure information and the last attempted entry of a key will be deleted.

During the "send program" subroutine, the N control character must be in the K2 stage before this subroutine will be executed. However, if either the control character E or the control character S is sensed in the K1 stage, the PLA 113 will go from state 9 to state 12. The control characters S and E in the K1 stage during the "send program" subroutine when the control character N is in the K2 stage indicate that the end of a program has been reached. The S and O characters in the K1 and K2 stages, respectively, indicate that the beginning of the first stored program has been encountered or sensed in the register 46. Accordingly, the first program stored in the register 46 will always be indicated by the control character S preceeded by the control character O. When a HALT (H control character) is encountered in the K1 stage and the N character in the K2 stage, the HALT latch 116 is set while the PLA 113 is going from state 9 to state 10. The HALT latch 116 being set will cause an exit from the "send program" subroutine when state 11 is reached and PLA 113 returns to idling state 3 through state 0.

OPERATION

The operation of the programmer 20 will be explained with reference to FIGS. 11A-J which represent the flow of information during particular subroutines. Those subroutines which are not shown in FIGS. 11A-J can and will be explained without illustrations.

INITIALIZE

Initialy, when power is first applied to the programmer 20, the PLA 113 will be in an undefined state and the registers 42 and 46 will contain random information. Such random information is represented by an X in registers 42 and 46. During the "power up clear" subroutine shown in FIG. 11A, the PLA 113 goes from the initial undefined state to state 15 and begins shifting binary 0s through the register 42 and into the register 46. This function is represented on lines 2 and 3 of FIG. 11A with the arrow indicating the transmission of information from an output of the register 42 to an input of the register 46. This clearing operation of shifting binary 0s will continue until an operator of the programmer 20 depresses one of the control keys to cause the PLA 113 to move from state 15 to state 1. As previously mentioned, the human delay involved in this key closure should be sufficient for the clearing operation to be completed as shown in line 4 of FIG. 11A. When the PLA 113 is going from state 15 to state 1, the control character N is entered into the register 42 as shown in line 5 of FIG. 11A. Thereafter, the PLA 113 moves from state 1 to state 2 and enters the control character E into the register 42 and shifts the control character N from the register 42 into the register 46. After the control character E has been entered into the register 42, it is shifted into the register 46 and binary 0s are shifted into the register 42. This operation continues until the control characters E and N are in the K1 and K2 stages, respectively.

If, by chance, the clearing operation is not completed when the operator actuates one of the control keys, the clearing operation will more than likely be completed while the PLA is in state 2 and recirculating information to move the control characters E and N into the K1 and K2 stages, respectively. After the control characters E and N are in the stages K1 and K2, respectively, the PLA 113 will go to state 0, await the condition $\overline{VK}$, and then proceed to state 3, the idling state, to await the condition VK before proceeding to state 4.

$\overline{RUN}$—LOAD PROGRAM SUBROUTINE

Figure 11A:
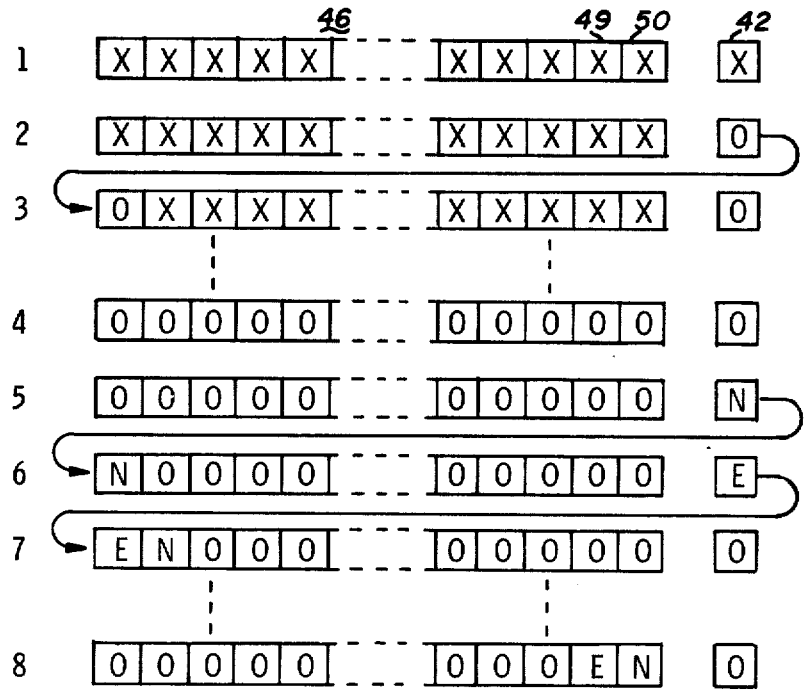
FIG. 11A is a representation of the information content in the main storage register illustrated in FIG. 4 during the initialized state of the programmer of the present invention.
Figure 11B:
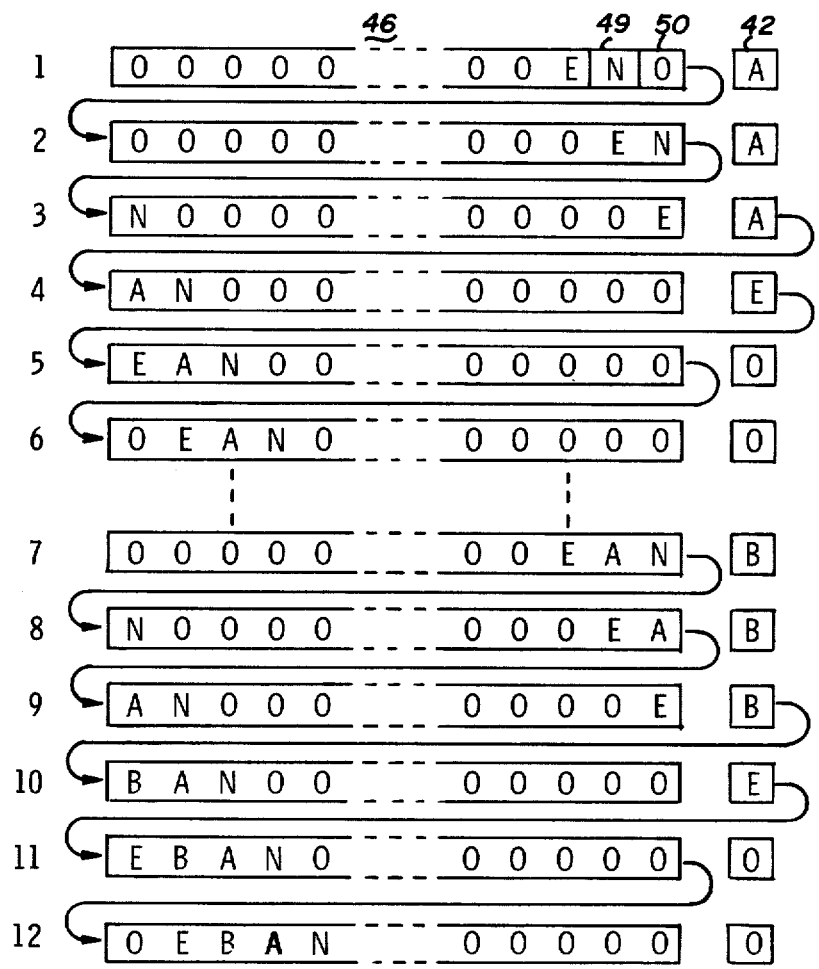
FIG. 11B is a representation of the information content in the main storage register when a character or key closure information word is being entered therein.

The "load character" subroutine is shown in FIG. 11B. While the PLA 113 is in state 3, the contents of the registers 42 and 46 are being recirculated, such that information is continuely flowing through the register 46. Also, when the PLA 113 is in state 3, the register control PLA 86 is instructed to enter key closure information on the lines 38 (FIG. 6) into the I/O register 42. This is represented by the character A in the register 42 on line 1 of FIG. 11B.

Thereafter, the PLA 113 remains in state 3 and circulates information in the register 46 until the condition VK exists to cause the PLA 113 to go to state 4. During the LOAD mode, the PLA 113 will remain in state 4 until the control character E is sensed in the K1 stage 49 as shown on line 2 of FIG. 11B. Thereafter, the PLA 113 exits from state 4 and enters state 6 and circulates the control character N from the K2 stage 50 thereof to an input stage thereof as shown on line 3 of FIG. 11B.

When the PLA 113 goes from state 6 to state 5, key closure information (A) is shifted from the register 42 into the register 46 as shown on line 4 of FIG. 11B. During this shifting operation, the control character E is shifted into the register 42, such that when the PLA 113 goes from state 5 to state 0, the control character E is shifted from the register 42 into the register 46 as shown on line 5 or FIG. 11B. While the PLA is in state 0, the information in the register 46 is recirculated as shown by the arrow joining the output of the register 46 to the input of the register 46 on lines 6 of FIG. 11B. As explained above, the PLA 113 remains in state 0 until the condition $\overline{VK}$ exists, at which time it returns to idling state 3.

Thereafter, the information continues to recirculate in the register 46 until another key closure is performed while the PLA 113 is in state 3. That key closure is represented by the letter B in FIG. 11B. Again, the PLA 113 will remain in state 4 until the control character E is sensed in the K1 stage 49, as represented on lines 7 and 8 of FIG. 11B. Accordingly, all of the information which proceeds the control character E, except for the information in the K2 stage 50 will have recirculated to the input end of the register 46 before the PLA 113 leaves state 4 and goes to state 6. When the PLA 113 goes from state 4 to state 6, the information in the register 46 is recirculated for one word time, such that the key closure information A is entered into the input stage of the register 46 and the control character E is in the K2 stage 50 as shown on line 9 of FIG. 11B. Thereafter, the PLA 113 goes through state 5 to shift the key closure information B into the register 46 and the control character E into the register 42 as shown on line 10 of FIG. 11B. When the PLA 113 advances from state 5 to state 0, the control character E is shifted into the register 46 as shown on line 11 of FIG. 11B. Thereafter, the register 46 is recirculated and eventually the PLA idles in state 3 awaiting another key closure occurance.

During the "load character" subroutine when the PLA 113 is prepared to exit from state 5 and enter state 0, the presence of the N control character in the K1 stage 49 will cause the PLA 113 to go from state 5 to state 7. When this condition is sensed with the control character N in the K1 stage and the control character E in the I/O register 42, the register 46 will be completely filled with information. It will be remembered that the O control character must always preceed the first program stored in the register 46. Accordingly, the O control character contained in the K2 stage 50 when the information is as shown on line 10 of FIG. 11B must be retained. When the above condition is sensed, the PLA 113 enters state 7 and causes the contents of the register 42 (control character E) to be shifted into the register 46. Thereafter, the PLA 113 remains in state 7 until the control character E has been circulated to the K1 stage 49. The PLA 113 then leaves state 7 and enters state 5 and causes a control character E to be entered into the I/O register 42. After the control character E has been entered into the register 42, binary 0s are shifted in behind it, thereby writing over the last entered key closure information with a binary 0 word. That binary 0 word is then shifted into the register 46 behind the previously entered control character E and the first entered control character E remains in the I/O register 42, where it will be written over by the information entered during the next occurance of a key closure.

As previously mentioned, during the "load program" subroutine, upon closure of the START key, the PLA 113 will enter the "initialize" subroutine at state 1. When the PLA 113 goes from state 4 to state 1, the control character N will be entered into the I/O register 42 and write over the character S which has been entered therein as a result of the closure of the START key. Thereafter the register control PLA 86 is instructed to shift the contents of the register 42 into the register 46, such that the newly entered control character N is shifted into the register 46. At this time, the first control character N will be in the register 42 and the control character E will be in the K2 stage 50. When the PLA 113 goes from state 1 to state 2, the control character E is entered into the I/O register 42 over the character N contained therein and binary 0s are shifted in after it to eliminate the first control character E. It can be appreciated, therefore, that this sequence reinitializes the registers 42 and 46.

$\overline{RUN}$—DELETE

During the LOAD mode of operation when the PLA 113 is in state 3, closure of the DELETE key will enter the binary information corresponding thereto into the register 42 as shown on line 1 of FIG. 11C. Thereafter, the PLA 113 will enter state 4 and remain in state 4 until the control character E is sensed in the K1 stage 49 as shown on lines 2 and 3 of FIG. 11C. The PLA 113 will go from state 4 to state 5 and enter the control character E over the binary information corresponding to the closure of the DELETE key as shown on line 4 of FIG. 11C. Thereafter, binary 0s will be shifted into the register 42 behind the control character E, thereby writing over key closure information B with binary 0s as shown on line 5 of FIG. 11C. Also, the control character E will be entered into the storage register 46. When the PLA 113 goes from state 5 to state 0, the first entered control character E will be entered into the I/O register 42 as shown on line 6 of FIG. 11C. Thereafter, the register 46 will be recirculated and the former control character E will remain in the I/O register 42 and will be written over with the next key closure occurance. Accordingly, it can be appreciated that the above described "delete" subroutine will remove a character from the main storage register 46 which immediately preceeds the control character E, unless that control character is an N as will be described below.

If, during the "delete" subroutine, the control character N is sensed in the K2 stage while the PLA 113 is in state 4, the PLA 113 will go from state 4 to state 0 and effectively ignore the delete command. However, as the PLA 113 goes from state 4 to state 0, it will set the alarm to indicate that occurance.

If, on the other hand, the control character S is in the K2 stage during the "delete" subroutine when the PLA 113 is in stage 4, the same sequence will be followed as shown in FIG. 11C to delete the S control character. However, as the PLA 113 goes from state 4 to state 5, it will also set the alarm to indicate the removal of the S control character.

$\overline{\text{RUN}}$—IGNORE KEY

During the LOAD mode when the PLA 113 is in state 3 and the SKIP key is depressed, the control character S will be entered into the I/O register 42 and the PLA 113 will enter state 4. After entering state 4, the PLA 113 will enter state 6 if the control character E is sensed in the K1 stage 49 and neither one of the control characters S or N is sensed in the K2 stage 50. Accordingly, under such conditions, the control character S will be entered into the program as desired. However, if either one of the control characters S or N is in the K2 stage when the control character E is in the K1 stage and the PLA 113 is in state 4, the PLA 113 will go from state 4 through state 14 to state 0, thereby effectively ignoring the key entry. The control character S which remains in the I/O register 42 will be written over when the PLA 113 is again in state 3 and new key closure information is received into the I/O register 42. The reason for ignoring the entry of the SKIP key when the above conditions exist is that if the control character S which results by the closure of the SKIP key is entered into the program, it will effectively block further accessing of the stored program. This result is, of course, not desirable and, therefore, the attempted entry of the control character S when such conditions exist is ignored. Furthermore, such entry would take up unnecessry space in the main storage register 42.

RUN MODE

During the RUN mode of operation, when the PLA 113 is in state 3, the closure of any key other than the START or SKIP keys will cause the PLA 113 to go from state 3 through state 4 and state 0 to state 3, thereby effectively ignoring the key closure information which has been entered into the I/O register 42. Since that information will remain in the I/O register 42 when the PLA 113 enters state 3, the subsequent closure of a key will cause the information to be written over with new information.

RUN—SEND PROGRAM

The "send program" subroutine is shown in FIGS. 11D, E and F. FIG. 11E shows the interrupt or halt sequence and FIG. 11F shows the termination sequence of the "send program" subroutine. During the RUN mode of operation when the PLA 113 is in state 4, as the result of the closure of the START key, a control character S will be contained in the I/O register 42 as shown on line 1 of FIG. 11D. The first program stored in the register 46 is formed of key closure information designated A, B and C and the control character H. A second program is also contained in the register 46 as shown in FIG. 11D and contains key closure information F. The beginning of the seocnd program is marked with the control character S and the end of all programs stored in the register 46 is marked with the control character E.

While the PLA 113 is in state 4, the contents of the register 46 will be recirculated until the control character N is in the K2 stage 50 thereof as shown on line 2 of FIG. 11D. Thereafter, the PLA 113 goes from state 4 to state 9 and the register 46 is again recirculated until the condition $\overline{\text{VK}}$ exists and the control character N is again sensed in the K2 stage 50 thereof as shown on lines 3 and 4 of FIG. 11D.

When the PLA 113 is in state 9 and the control character N is in the K2 stage, the absence of any of the control characters, S, E or H in the K1 stage with the HALT latch 116 reset will cause the PLA 113 to go to state 10 and shift the contents of the register 42 into the register 46 as shown on line 5 of FIG. 11D. From state 10, the PLA 113 goes to state 11 and again shifts the contents of the register 42 into the register 46 as shown on line 6 of FIG. 11D. While the PLA is in state 11, the contents of the register 42 (A) is employed for generating simulated key closure information corresponding thereto, which simulated key closure information is transmitted to the arithmetic unit 22. Also, while the PLA 113 is in state 11, the contents of the register 46 is recirculated until the condition VK exist which indicates the arithmetic unit 22 has accepted new key closure information. When this condition occurs, the PLA 113 moves from state 11 to state 9 and continues to recirculate the register 46 until the control character N is sensed in the K2 stage, as shown on lines 7 and 8 of FIG. 11D.

Thereafter, the PLA 113 again moves from state 9 through 10 to state 11, shifting the contents of the register 42 into the register 46 at both the entry to state 10 and the entry to state 11 as shown on lines 9 and 10, respectively, of FIG. 11D. At that time, the key closure information E will be contained in the I/O register 42 and simulated key closure information corresponding thereto will be transmitted to the arithmetic unit 22. Again, the register 46 is recirculated until the condition VK exists. It will be noted from FIG. 11D that key closure information A and B has not been destroyed, but remains stored in the program during the "send program" subroutine.

FIG. 11E shows a continuation of the "send program" subroutine shown in FIG. 11D, with lines 1 and 2 of FIG. 11E corresponding to lines 10 and 11 of FIG. 11D. When the PLA 113 moves from state 11 to state 9, it will wait in state 9 until the control character N is sensed in the K2 stage as shown on line 3 of FIG. 11E. However, at that time, the control character H will be contained in the K1 stage 49. Accordingly, the PLA 113 will move from state 9 to state 10, but will set the HALT latch 116 during that time. Also, the contents of the register 42 will be shifted into the register 46 as shown on line 4 of FIG. 11E. From state 10, the PLA 113 goes to state 11 and again shifts the contents of the register 42 into the register 46 as shown on line 5 of FIG. 11E. At that time, the control character H will be contained in the I/O register 42 and the HALT latch 116 will be set, such that the PLA 113 will go from state 11 to state 0. Thereafter, the contents of the register 46 will be recirculated, leaving the control character H in the register 42 while the PLA 113 moves from state 0 to state 3 to await another key closure occurance.

As will be explained more fully in the description of FIG. 11G, the closure of a START key after the interrupt sequence shown in FIG. 11E when the PLA 113 is in state 3 will cause the PLA 113 to again perform the "send program" subroutine until a HALT is encountered or either the control character S or the control character E is sensed in the K1 stage while the PLA 113 is in state 9. The condition of the registers 42 and 46 during this sequence while the PLA 113 is in state 9 may be that shown on line 1 of FIG. 11F. While the PLA 113 is in state 9, the contents of the register 46 will be recirculated until the control character N is sensed in the K2 stage as shown on line 2 of FIG. 11F. However, the control character S is also sensed in the K1 stage as shown on line 2 of FIG. 11F such that the PLA 113 will move from state 9 to state 12 and cause the contents of the register 42 to be shifted to the register 46 as shown on line 3 of FIG. 11F. The PLA 113 remains in state 12 and recirculates the contents of the register 46 until the control characters S and O are sensed in the K1 and K2 stages, respectively, as shown on lines 4 and 5 of FIG. 11F. When this condition occurs, the PLA 113 goes from state 12 to state 5 and recirculates the contents of the register 46 for one word time as shown on line 6 of FIG. 11F. Thereafter, the PLA 113 goes from state 5 to state 0 and shifts the contents of the register 42 into the register 46 as shown on line 7 of FIG. 11F. Accordingly, at the end of the termination sequence, the control character S which was previously employed for indicating the beginning of the first program stored in the register 46 will be contained in the register 42 while the PLA 113 is in the idling state 3. If, at that time, an operator changes from the RUN mode to the LOAD mode and enters key closure information, the first of such key closure information will write over the control character S contained in the register 42 and such information will be loaded into the program as described above.

RUN—START FROM HALT

A portion of the "send program" subroutine which begins when the PLA 113 is in state 3 after the program has been halted at the end of the interrupt sequence is illustrated in FIG. 11E. During the RUN mode, therefore, when the PLA 113 is in state 3 and the control character H is in the I/O register 42, the closure of any key will write over the H control character in the register 42. Thereafter, closure of the START key will again write over whatever information is then found in the I/O register 42. Accordingly, the information originally in the registers 42 and 46 will appear as that on line 1 in FIG. 11G, and entry of the S character will appear as the information shown on line 2 of FIG. 11G. When the control character N is in stage K2, as shown on line 2 of FIG. 11G, and after the PLA 113 has moved from state 3 into state 4, the PLA 113 will move into state 9 and enter the control character H into the I/O register 42 by writing over the control character S therein as shown on line 3 of FIG. 11G. Thereafter, the PLA 113 will go from state 9 through state 10 to state 11, first shifting the control character H into the register 46 and then the control character N from the register 42 into the register 46 as shown on lines 4 and 5 of FIG. 11G. If, a point, additional key closure information is in stage K2, the "send program" portion of the subroutine including states 9, 10 and 11 will be repeated to send a simulated strobe pulse in accordance with that information to the arithmetic unit 22.

However, if the control character H is contained at that time in the K2 stage, the sequence shown in FIG. 11E will be followed. Also, if either the control character S or E is contained in the K2 stage at that time, the sequence shown in FIG. 11F will be followed.

RUN—SKIP

During the RUN mode when the PLA 113 is idling in state 3 and the HALT latch 116 is not set, closure of the SKIP key will cause an S control character to be entered into the I/O register 42 as shown on line 1 of FIG. 11H. The subsequent release of the SKIP key will cause the PLA 113 to go from state 3 to state 4 and await the condition K2N as shown on line 2 of FIG. 11H. Thereafter, the PLA 113 goes to state 8 and shifts the contents of the register 42 into the register 46 as shown on line 3 of FIG. 11H. The PLA 113 will then remain in state 8 until the condition K2S occurs as shown on line 4 of FIG. 11H. In the example illustrated in FIG. 11H, the control character S contained in the I/O register 42 on lines 1 and 2 marks the beginning of the first program and control character S contained in the register 46 on those lines marks the beginning of a second program. If such a second program does not exist, the S which previously existed in the register 42 on lines 1 and 2 will occupy the position at the K2 stage on line 4 of FIG. 11H.

When the control character S is sensed in the K2 stage, the PLA 113 goes from state 8 to state 9 and shifts the contents of the register 42 into the register 46 as shown on line 5 of FIG. 11H. Thereafter, the PLA 113 follows the "send program" subroutine shown in FIG. 11D to transmit simulated key closures corresponding to the information contained in the accessed program.

If a control character H is sensed in the K1 stage while the PLA 113 is in state 9 during the "send program" subroutine, the PLA 113 will follow the interrupt sequence shown in FIG. 11E. If, however, neither a control character S or a control character E is sensed in the K1 stage when the PLA 113 is prepared to leave state 9, the termination sequence illustrated in FIG. 11F will be followed.

RUN—SKIP FROM HALT

When the PLA 113 is idling in state 3 at the end of the sequence illustrated in FIG. 11E, closure of any key will write over the control character H contained in the I/O register 42. Subsequent closure of the SKIP key will again write over whatever information is then found in the I/O register 42 as shown on line 1 of FIG. 11J. When the condition VK exists, the PLA 113 will move from state 3 to state 4 and await the condition K2N as shown on line 1 of FIG. 11J. Thereafter, the PLA 113 will go from state 4 to state 9 and enter the control character H to the I/O register 42 over the control character S as shown on line 2 of FIG. 11J. While the control character H is being entered into the register 42, the register 46 is being recirculated as shown on line 3 of FIG. 11J. Thereafter, the PLA 113 stays in state 9 until the control character N is in the K2 stage as shown on line 4 of FIG. 11J.

Since the HALT latch 116 has not been reset, the PLA 113 will go to state 8 from state 9, reset the HALT latch 116 and shift the contents of the register 42 into the register 46 as shown on line 5 of FIG. 11J. The PLA 113 will then stay in state 8 until the control character S is contained in the K2 stage as shown on line 6 of FIG. 11J. Thereafter the PLA 113 will go from state 8 to state 9 and shift the contents of the register 42 into the register 46 as shown on the line 7 of FIG. 11J. After the PLA 113 has entered state 9, it will remain in state 9 until the control character N is sensed in the K2 stage and then will send the program which immediately follows the control character S which was sensed in K2 stage while the PLA 113 was in state 8.

SUMMARY

The programmer module of the present invention is connected directly to and operates through the switch lines of a keyboard or an equivalent input terminal of a machine. Because of this capability of the programmer of the present invention, a one-to-one correspondence exists between the information entered via the input terminal of an associated machine when a program is being loaded and the actual information in the program which is stored. Other known programmers do not provide such a one-to-one correspondence, since they are removed from the keyboard or other input terminal of the associated machine. Also, such prior known programmers are constructed as an integral part of the machine with which they are associated. Accordingly, it can be appreciated that prior known programmers are dedicated to the particular machine with which they are associated and usually can not be employed with other types of machines.

Also disclosed in the above description is a power up clear circuit which relies on the human delay of the operator to permit a clearing operation to be performed. As a result of this circuit, relatively small timing devices can be employed such that they can be formed as integrated circuits.

In addition, a method of implementing a programmable logic array is disclosed in which all of the branch products thereof need not be implemented. Also, a method of implementing a programmable logic array is disclosed in which outputs thereof can be ORed to increase the versitility of such a programmable logic array. Both of these methods rely on the characteristic of a programmable logic array in which one of its binary levels is a predominant level which will override the other binary level thereof.

In addition, a method of loading and accessing a program is disclosed. The programmer of the present invention, because of the method employed for loading and accessing a program, is completely asynchronous with respect to an associated machine.

It can be appreciated that the programmer of the present invention can be modified without departing from the spirit and scope of the appended claims. For example, any size storage register may be employed as the main storage register 46. Furthermore, it can be appreciated that the storage capacity of the main storage register 46 can be increased without making any other modification to the other components of the programmer.

The particular embodiment of the programmer described herein is intended to be employed with a matrix keyboard. However, it can be appreciated that the programmer of the present invention can be employed with any keyboard or equivalent input terminal. If a keyboard is employed which is not strobed, such as the keyboard illustrated in FIG. 3, the comparison function performed by the register control PLA 86 can be eliminated. In addition, it can be appreciated that the programmer of the present invention can be employed with a matrix keyboard in which the D-lines thereof are not strobed successively, but randomly.

Also, the programmer of the present invention can be modified to include branching and program labeling by using additional control keys. The branching technique can be accomplished by employing a modified form of the HALT function described above. Additional control keys can be provided on the keyboard to indicate more than one type of HALT, such that when a particular condition exists in a program while it is being accessed, that condition will cause the programmer to begin the execution of a different program.

Additional control keys on the keyboard can also be employed for program labeling, such that any desired program can be selected by the operator. One way of implementing this technique is to employ a plurality of keys corresponding to the SKIP key described above, each of which designates a separate and distinct program. Another way of implementing this technique is to permit the storage of a code word after each SKIP character which has been loaded to identify a particular program.

Accordingly, it can be appreciated that the programmer of the present invention is a versitile device. Furthermore, the programmer of the present invention provides many distinct advantages which are not realized by prior known programmmers.

The invention claimed is:

1. A programmer adaptor module for converting a non-programmable calculator into a programmable calculator, said non-programmable calculator including an arithmetic-logic unit connected via a bus to a keyboard, said keyboard operating to generate key-closure signals on said bus representative of the respective keys thereon as they are manually pressed, and said arithmetic-logic unit operating to receive said key-closure signals from said bus and to take predetermined action in response thereto; wherein said programmer adaptor module includes:

digital encoder means for connection to said bus to receive said key-closure signals and for encoding said key-closure signals into sequences of digital words representative of the sequence in which said keys are manually depressed;

digital memory means for storing therein and for subsequently retrieving therefrom said sequences of digital words;

means for generating mode control logic signals;

memory input control means having first inputs connected to said encoder for receiving said digital words therefrom, second inputs for receiving said logic signals, and coupled to said digital memory means for storing therein said sequences of digital words when said logic signals are in a first predetermined state; and memory output control means having first inputs connected to said encoder for receiving said digital data words therefrom, second inputs for receiving said logic signals, and coupled to said digital memory means for retrieving therefrom portions of said sequences of data words starting with a first predetermined word and ending with a second predetermined word and for generating simulated key-closure signals on outputs for connection to said bus to simulate the closing of said keys in the sequence represented by said retrieved portion of words in response to receiving predetermined digital words from said encoder means when said logic signals are in a second predetermined state.

2. A device according to claim 1, wherein said digital memory means is comprised of a digital shift register.

3. A device according to claim 1, wherein said digital memory means is comprised of a random access memory.

4. A device according to claim 1, wherein said keyboard includes a plurality of keys interconnected in a matrix of row lines and column lines, and wherein said encoder has inputs for connection to said row and column lines for receiving said key-closure signals therefrom, and said memory output control means has outputs for connection to said row lines for generating said simulated key-closure signals thereon.

5. A device according to claim 1, wherein said second inputs of said memory input control means and said memory output control means include a common input lead for carrying a RUN logic signal and said memory input control means stores said sequences in response to said RUN signal being false while said memory output control means generates said simulated key-closure signals in response to said RUN signals being true.

6. A device according to claim 1, wherein said memory input control means includes means for entering said first predetermined data word in said memory means in response to receiving a digital data word from said encoder means representative of a START key on said keyboard being depressed.

7. A device according to claim 1, wherein said memory input control means includes means for entering said second predetermined data word in said memory means in response to receiving a digital data word from said encoder means representative of a HALT key on said keyboard being depressed.

8. A device according to claim 1, wherein said memory input control means further includes means for deleting from said digital memory means, the last digital data word entered in said memory means in response to the receipt of a digital data word from said encoder means representative of a DELETE key on said keyboard being depressed.

9. A device according to claim 1, wherein said memory output control means includes decoder means coupled to said memory means for detecting said first and second predetermined data words and for generating control signals to respectively start and stop the generating of said simulated key-closure signals.

* * * * *